(12) United States Patent
Kotefski et al.

(10) Patent No.: US 12,202,978 B2
(45) Date of Patent: *Jan. 21, 2025

(54) METHODS OF MAKING A HYBRID CRUDE OIL USING PETROLEUM-BASED WASTE STREAM PRODUCTS

(71) Applicant: Stojan Kotefski, Bloomingdale, NJ (US)

(72) Inventors: Stojan Kotefski, Bloomingdale, NJ (US); Michael Paul Fitzpatrick, Bloomingdale, NJ (US); Nikola Michael Kotevski, Bloomingdale, NJ (US); Michael Kenwood Fitzpatrick, Butler, NJ (US)

( * ) Notice: Subject to any disclaimer, the term of this patent is extended or adjusted under 35 U.S.C. 154(b) by 47 days.

This patent is subject to a terminal disclaimer.

(21) Appl. No.: 18/055,775

(22) Filed: Nov. 15, 2022

(65) Prior Publication Data

US 2023/0075737 A1     Mar. 9, 2023

Related U.S. Application Data

(60) Division of application No. 16/831,119, filed on Mar. 26, 2020, now Pat. No. 11,549,016, which is a
(Continued)

(51) Int. Cl.
*C08L 91/00* (2006.01)
*C08L 95/00* (2006.01)

(52) U.S. Cl.
CPC ............. *C08L 91/00* (2013.01); *C08L 95/00* (2013.01); *C08L 2555/34* (2013.01)

(58) Field of Classification Search
CPC ...... C08L 91/00; C08L 95/00; C08L 2555/34; C08L 2205/02; C08L 2205/025; C04B 26/26; Y02W 30/91; C10C 3/007
See application file for complete search history.

(56) References Cited

U.S. PATENT DOCUMENTS

| 3,856,474 A | 12/1974 | Pittman et al. |
| 4,222,851 A | 9/1980 | Good et al. |

(Continued)

FOREIGN PATENT DOCUMENTS

| CA | 3079022 A1 | 11/2021 |
| CA | 3183915 A1 | 11/2021 |

(Continued)

OTHER PUBLICATIONS

"Asphalt", Wikipedia, retrieved from the internet on Jul. 20, 2024 at <https://en.wikipedia.org/wiki/Asphalt>.
(Continued)

*Primary Examiner* — Ellen M McAvoy
(74) *Attorney, Agent, or Firm* — Samuel A Kassatly

(57) ABSTRACT

Methods of making a hybrid crude oil using man-made or natural petroleum-based waste stream products. The hybrid crude oil is composed of an oil-based solution and petroleum-based coatings that were extracted from a petroleum-containing material. This hybrid crude oil is created by elevating the temperature of the oil-based solution to or above an elevated temperature, i.e., the melting or phase-change temperature of the petroleum-based coating so that it can become liquified and dissolve into the oil-based solution and create the hybrid crude oil. The petroleum-containing material is submerged into the heated oil-based solution to cause the petroleum-based coatings to dissolve into the heated oil-based solution at the elevated temperature. The liquid oil-based solution at the elevated temperature creates an environmental seal to the petroleum-based coatings to protect them from burning, carburizing, or degrading, until the liquid oil-based solution is capable of providing the necessary thermal energy for the phase change of the petroleum-based coating from a solid state to a liquid state. At which time, the petroleum-based coatings safely phase- (Continued)

changes into a liquid and dissolves into the oil-based solution, creating the hybrid crude oil.

23 Claims, 4 Drawing Sheets

Related U.S. Application Data continuation-in-part of application No. 15/983,886, filed on May 18, 2018, now Pat. No. 10,640,712, which is a continuation-in-part of application No. 15/395,298, filed on Dec. 30, 2016, now abandoned, and a continuation-in-part of application No. 15/355,487, filed on Nov. 18, 2016, now abandoned.

(56) References Cited

U.S. PATENT DOCUMENTS

| | | | |
|---|---|---|---|
| 4,269,693 A | 5/1981 | Hastie | |
| 4,279,660 A | 7/1981 | Kamo et al. | |
| 5,053,118 A | 10/1991 | Houser | |
| 5,848,755 A | 12/1998 | Zickell et al. | |
| 5,938,130 A | 8/1999 | Zickell | |
| 6,207,044 B1 | 3/2001 | Brimhall | |
| 8,715,488 B1 | 5/2014 | Miller | |
| 8,789,773 B2 | 7/2014 | Teeter et al. | |
| 9,399,713 B1 | 7/2016 | Ozer | |
| 10,214,617 B1 | 2/2019 | Bruns et al. | |
| 10,703,909 B1 | 7/2020 | Nystrom | |
| 2005/0012069 A1 | 1/2005 | Maes et al. | |
| 2011/0180458 A1 | 7/2011 | Duyvesteyn et al. | |
| 2012/0167802 A1 | 7/2012 | Huh | |
| 2013/0090415 A1 | 4/2013 | Kusano | |
| 2013/0220175 A1 | 8/2013 | Zickel | |
| 2013/0240411 A1 | 9/2013 | Karsten et al. | |
| 2014/0014000 A1* | 1/2014 | Franzen | B02C 19/0056 241/16 |
| 2014/0283710 A1 | 9/2014 | Kusano | |
| 2014/0299018 A1 | 10/2014 | Elseifi et al. | |
| 2016/0145434 A1 | 5/2016 | Gillespie | |
| 2016/0362339 A1* | 12/2016 | Franzen | C04B 26/006 |
| 2019/0256782 A1 | 8/2019 | Shelton | |
| 2019/0322943 A1* | 10/2019 | Ganti | C10G 32/00 |
| 2019/0389769 A1 | 12/2019 | Bruns et al. | |
| 2020/0325071 A1* | 10/2020 | Franzen | E04D 1/20 |
| 2021/0179852 A1 | 6/2021 | Nystrom | |

FOREIGN PATENT DOCUMENTS

| | | |
|---|---|---|
| CA | 3078989 A1 | 4/2024 |
| CN | 108473773 B | 3/2022 |
| EP | 2476657 A1 | 7/2012 |
| GB | 1558320 A | 12/1979 |
| GB | 2186285 A | 3/1986 |
| JP | S5639209 A | 4/1981 |
| NL | 2010586 C2 | 10/2014 |
| SG | 186246 A1 | 1/2013 |
| SI | 1167486 T1 | 6/2005 |
| WO | 8705042 | 8/1987 |
| WO | 2005068080 A1 | 7/2005 |
| WO | 2014168477 A1 | 10/2014 |
| WO | 2017116831 A1 | 7/2017 |
| WO | 2018094315 A1 | 7/2018 |
| WO | 2018125952 A1 | 7/2018 |

OTHER PUBLICATIONS

"Motor oil", Wikipedia, retrieved from the internet on Jul. 20, 2024 at <https://en.wikipedia.org/wiki/motor_oil>.

* cited by examiner

METHODS OF MAKING A HYBRID CRUDE OIL USING PETROLEUM-BASED WASTE STREAM PRODUCTS

PRIORITY AND RELATED APPLICATIONS

The present application is a Divisional Application of U.S. Non-provisional application Ser. No. 16/831,119, filed Mar. 26, 2020, now issued as U.S. Pat. No. 11,549,016, on Jan. 10, 2023, which in turn, is a Continuation-In-Part of U.S. Non-provisional application Ser. No. 15/983,886, filed May 18, 2018, now issued as U.S. Pat. No. 10,640,712, on May 5, 2020, which in turn, is a Continuation-In-Part of U.S. Non-provisional application Ser. No. 15/355,487, filed Nov. 18, 2016, and U.S. Non-Provisional application Ser. No. 15/395,298, filed Dec. 30, 2016. Applicants claim the priority dates of these parent Non-provisional patents and related U.S. applications, all of which being incorporated herein by reference in their entireties. The present application further relates to PCT application number PCT/US2017/062510; PCT application number PCT/US2017/068623; PCT Application No. PCT/US2020/033321; Canadian patent application No. 3,078,989; Canadian patent application No. 3,079,022; and Canadian patent application No. 3,183,915, all of which are incorporated herein by reference in their entireties.

FIELD OF THE INVENTION

The present invention is in the field of mining, reclamation and recycling. Specifically, the present invention provides methods for retrieving organics, including petroleum products and byproducts, crude oil, and the recovery and recycling of organics-containing products, such as asphalt as well as the resulting recycled materials. More specifically, the present invention relates to a hybrid crude oil and methods of making the same using petroleum-based waste stream products.

BACKGROUND

The following discussion proceeds with the exemplary petroleum-based material of asphalt, although it is to be understood that other petroleum-based, petroleum-containing and organic materials exist which are either desirous of being recycled or in certain instances, desirous of being mined and abstracted from their native and virgin environment. Accordingly, the present invention contemplates and includes all such petroleum-based, petroleum-containing and other organic materials within its scope.

Asphalt is a universal raw material used for roadways, parking lots and other surface treatments. The asphalt material is generally a composition of minerals including aggregate and sand or stone dust and an asphalt binder. Additionally, novel asphalt mixtures include various substitutes for the aggregate (coarse and fine) including: glass that been reduced in size, used tires, and other reclaimed materials. The asphalt binder is basically the glue that binds the mineral or aggregate ingredients such that they are solid under normal operating or environmental temperatures but liquid or semi-liquid under elevated temperatures, such as 300-400° F. Another product related to the commonly known term as asphalt is roofing shingles, composed of similar components including aggregate, asphalt binder, and fiberglass.

A typical asphalt composition contains a general ratio of materials as follows: coarse aggregate including minerals or stone, that have been reduced in size, having particle sizes in the range from about ⅛ to 1 inch, or 70-85% of volume, fine aggregate including compositions of stone dust that has been reduced in size, glass that has been reduced in size, sand or other small sized filler, or 10-20% of volume, asphalt binder, a blend of petroleum refinery product (byproduct) that can be further modified to achieve certain asphalt mixtures or grades, about 10% of volume, and miscellaneous ingredients including trapped air (voids) and moisture. A typical asphalt mixture is the blending of the coarse and fine aggregate with the asphalt binder. However, in the blending process, some trapped air is normally also included. The amount of trapped air and the coating and bonding of the asphalt binder to the aggregate determines the quality and grade of the final asphalt product. As these materials are mixed, the asphalt composition is subjected to elevated temperature (about 300-400° F.) and uniformly mixed such that a uniform blending of components is achieved. This hot mixture is bonded by the phase change of the asphalt binder from a semi-liquid to a solid as the mixture cools to a lower temperature or ambient temperature. As the semi-liquid asphalt binder coats the coarse and fine aggregates, the final asphalt mixture is blended to meet the requirements of the needed final product.

Certain asphalt mixtures are required to meet Department of Transportation specifications based upon application location, environmental and temperature ranges and other requirements. The various grades of asphalt are based upon the aggregate size (coarse and fine), content and percentages of the added components including binder. These asphalt grades created by their respective asphalt binders, screened aggregate particle sizes, compaction forces on the mixture and vibratory rolling to further orientate the final asphalt composition prior to solidification.

As the asphalt is applied to a surface and rolled so that the final flat surface is achieved, other variables are introduced that can affect asphalt quality. These variables or conditions include surface temperatures, asphalt temperatures, application thicknesses and other application variables that may affect the final grade of the asphalt achieved. The asphalt binder applied is a form of thermoplastic that solidifies as the temperature is reduced from the asphalt blending temperature (300-400° F.) to the final product application temperatures (−60 to 160° F.). These temperature ranges affect the temperature change rate or thermal gradient of the solidification process and this affects the final product compaction ratio, density and mechanical properties. The final asphalt product performance factors are based upon these components, the mixture ratios and application methods.

The asphalt binder is phase changed from a solid at ambient temperatures to a semi liquid or liquid state at elevated temperatures (a plastic state or high viscosity state) that coats the coarse and fine aggregates and fills the voids of the mixture. Aggregate uniformity coating issues occur with the semi liquid asphalt binder because it cannot be thoroughly liquid. After a certain elevation in temperature, the asphalt binder burns or degrades. This aggregate coating capability is an important aspect of achieving higher grade asphalts. It would be desirable to coat the aggregate in an improved manner.

Once an asphalt mixture is applied and rolled onto a desired surface (roadway, parking lot driveway, etc.), the lower temperature of the contact surface changes the asphalt binder back from a semi-liquid state to a solid. This becomes the desired asphalt final product. The coarse and fine aggregate compositions, mixture ratios and asphalt binder blends may further improve the asphalt mixture and final asphalt product properties that may provide an improved life cycle, operating temperature exposure characteristics, weight load bearing properties, surface coefficient of friction characteristics and other desired properties.

The current methods for recycling asphalt typically take certain percentages of "millings" or scrapped/salvaged asphalt from an existing, aged or degraded asphalt surface and blend a small percentage of these millings into a virgin mixture of asphalt (a blend of 25% millings to 75% virgin asphalt is a normal practice). These recycling methods provide a means of recovering small percentages of the "used" or "salvaged" asphalt for recycling back into a new asphalt. As a general rule, approximately 10-30% of millings can remixed with virgin asphalt. This is because the new asphalt mixture is degraded with the addition of aged millings because it does not blend as uniformly as virgin materials. This practice is not allowed in some jurisdictions (approximately 22 States have banned this process) because the new asphalt mixture (with the recycled asphalt content) is inferior. This is likely the result of the aged asphalt having asphalt binder in a crystalline or solid state that cannot phase change or liquefy as the virgin asphalt binder and thus cannot completely blend into the mixture. This yields a lower grade asphalt mixture that has limited use such applications as parking lots and driveways.

Elseifi et al., U.S. Patent Publication 2014/0299018, generally describe a process for separating constituents of an asphalt-based material including at least asphalt and one solid non-asphalt material by shredding the asphalt-based material to form a shredded material mass. Next, an asphalt binder at an elevated temperature is added to absorb the recoverable asphalt binder from the shredded material. This produces a 30-40% increase in the binder volume, i.e., the recovered binder from the shredded material.

Kotefski et al., U.S. Ser. No. 15/355,487, filed Nov. 18, 2016, the disclosure of which is herein incorporated by reference, generally teach methods to reclaim or recycle asphalt or asphalt components to produce reusable asphalt or asphalt components by adding the asphalt or asphalt components to a solution at a temperature higher than the melting temperature of the asphalt binder. The solution may be at least 300° F., 325° F., 350° F. or 400° F. or so, and the solution may be an oil or petroleum based solution or any other suitable solution in which the asphalt binder is soluble. In some instances, the solution may be virgin motor oil or recycled motor oil or used motor oil. It is desirable to provide new and improved methods to reclaim or recycle asphalt to produce reusable asphalt and asphalt components. Preferably, reusable asphalt and asphalt components that have the same physical properties of virgin asphalt. Specifically, the aggregate or minerals of the asphalt are not physically altered in size, shape, or profile.

Franzen et al., U.S. Ser. No. 13/833,091, filed on Mar. 15, 2013, generally describe a method of creating a processed asphalt suspension composition where the asphalt shingle material is reduced down to a particular size fine enough to effectively reuse the recycled shingle material into a new mixture of this recycled shingle material and the addition of virgin asphalt or an asphalt suspension composition. That is, the granules, fiberglass or other mineral components in the asphalt shingles are reduced to a mesh fine enough to be incorporated into newly manufactured products. Basically, Franzen starts the process by grinding both the asphalt with the various minerals and filler materials, to form a recycled shingle material of approximately 1 cm in size, which is then added to, and mixed with hot virgin asphalt.

The mixture is then sent to a wet grinding process to both reduce the particle size of the mineral particles but to fully incorporate the asphalt from the recycled ground shingle material into the virgin asphalt. The wet grinding process further reduces the size of the mineral particles to 200 microns from the initial reduction of 1 cm. This wet grinding process is a mechanical deformation means of reducing, crushing or pulverizing the mineral components of the recycled shingle material down to a size of 200 microns and well as a means of incorporating the asphalt from the recycled ground shingle material into the virgin asphalt. The wet grinding process creates a new mixture of ground shingle material and virgin asphalt, termed a processed asphalt suspension. The processed asphalt suspension is a mixture of the pulverized recycled single material and additional virgin asphalt or an asphalt paste containing pulverized minerals. However, Franzen's process, as representative of conventional processes, does not permit the mining, that is the retrieval, removal, or recovery of the original (i.e., initial or native) constituent components of the asphalt shingle material, in terms of size, shape, or profile.

It is also desirable to provide further improved methods to reclaim or recycle asphalt or asphalt components to produce reusable asphalt or asphalt components, petroleum-based, petroleum-containing, and organic materials that are either desirous of being recycled or in certain instances, desirous of being mined and abstracted from their native or virgin environment, organic materials, collectively referred to herein as petroleum-containing materials. These petroleum-containing materials include, for example: roofing shingles, pavement asphalt, tar sands, oil sands, shale, contaminated soils, and other petroleum-containing materials.

Crude oil is a natural product provided by various reserves on earth. This natural product can be processed or distilled into byproducts, such as gasoline, kerosene, plastics, asphalt for roofing shingles, asphalt binder for asphalt pavement, and numerous other products. While gasoline and kerosene are burned as a fuel source, plastics, asphalt for roofing shingles, and asphalt binder for asphalt pavement become waste stream products after their useful life. Each of these exemplary waste stream products creates a manmade pollution or waste stream on a continuous basis because crude oil or petroleum-based byproducts are a needed commodity and continue to be in great demand by consumers.

Oil does not dissolve in water. It lasts a long time and sticks to everything from beach sand to bird feathers. Oil and petroleum products are toxic to people, wildlife, and plants. One quart of motor oil can pollute 250,000 gallons of water, and one gallon of gasoline can pollute 750,000 gallons of water. Oil that leaks from cars onto roads and driveways is washed into storm drains, and then usually flows directly into a lake or stream. Used motor oil is the largest single source of oil pollution in lakes, streams, and rivers. Americans spill 180 million gallons of used oil each year into the nation's waters. This is about 16 times the amount spilled by the Exxon Valdez in Alaska. Reference is made to https://www.mass.gov/guides/education-in-nonpoint-source-pollution-prevention.

To date, and prior to the advent of the present invention, there has been no complete (or substantially complete) reclamation or recycling solution for these waste stream products. The waste stream products are created by the industry but after their useful life they become an unneeded waste stream that create significant ecological, environmental, or pollution issues.

The major sources of crude oil-based waste streams are generated by following industries:

a) Plastics industry has a plastics waste stream comprised of various plastics.
b) Roofing industry has a roofing waste stream composed of asphalt roofing shingles or commonly called roofing shingles, which is a composition of asphalt (or asphalt binder), fiberglass, and stones or aggregates as a solid composition.
c) Asphalt pavement industry has an asphalt pavement or millings waste stream which is a solid composition of asphalt binder and various sized aggregates, minerals, glass, and sands.

Each of these industries offers partial solutions for the reclamation of their respective used products or waste stream products. Globally, the recycling of these waste stream products is a serious concern because the partial reclamation processes are not entirely adequate, and are prone to creating an environmental and pollution catastrophe. Specifically, in the asphalt pavement industry approximately 25% of used asphalt pavement or millings can re-mixed with virgin asphalt pavement and the balance becomes a waste stream product. A similar scenario occurs with the roofing shingles because they too, offer low reclamation or recycling percentages.

BRIEF SUMMARY

In a first aspect, the invention provides a method to retrieve, reclaim, or recycle various organic-based or organic-containing materials or petroleum-based coatings which coat the mineral portion of a petroleum-containing material, including naturally occurring materials such as crude oil and other petroleum-based and organic materials, manufactured compositions including or containing these materials, including materials such as asphalt or asphalt components, to retrieve such materials from their native origins, or in the instance of manufactured materials such as asphalt, to recycle and thereby produce reusable asphalt or asphalt components that offer quality as close to virgin material as possible. With respect to the naturally occurring or manufactured material, the method of recycling and reuse features:

(a) providing petroleum-containing material, such as sand oil, sand tar, shale, or asphalt, and
(b) adding the petroleum-containing material to a solvent in which the petroleum-based coating is soluble.

In particular, the solvent may be added to a vessel or container and can thereby function as a bath into which the asphalt or the petroleum-based material to be separated and recovered may be placed. The solvent may be provided and used at approximately ambient temperature, for instance, of 50-100° F., or 60-90° F., or 70-80° F. or so. The solvent may be, for instance, heptane, hexane, naphtha, kerosene, gasoline or a petroleum-based solvent or any other suitable solvent in which the petroleum-based coating is soluble. The recovered petroleum-based material may be added to the bath and treated to dissolve the asphalt binder or the petroleum-based material as part of the separation and recovery process. A particular non limiting example of equipment that may function as a solvent bath is an automated parts washer or equivalent equipment that can be operated with one or more solvents in which the asphalt binder or the petroleum-based coating is soluble. The petroleum-based material has the petroleum-based coating in a solid state, and the solvent may be provided in a liquid or gaseous state. The materials may be prepared in a first slurry mass that could include solid materials (minerals, aggregates, and sand coated with residual binder or petroleum-based coating) and a solvent.

The solid materials or minerals may be separated via a screening operation while the solution of solvent, asphalt binder, or petroleum-based coating can be further treated. This solution may then be further separated to form a reclaimed solvent mass and an asphalt binder mass or petroleum-based coating mass.

The method may further feature reducing the asphalt to be reclaimed or recycled into chunks, millings or particulates prior to step a) above.

The method may further feature c) screening or separating coarse aggregate and fine aggregate asphalt components from the solvent of b).

The method may further feature d) cleaning or removing asphalt binder or petroleum-based coating and/or the solution from the coarse aggregate and fine aggregate asphalt components screened or separated in step c). The cleaning or removing asphalt binder or petroleum-based coating and/or the solution from the coarse aggregate and fine aggregate asphalt components may be performed by evaporation, centrifugal spinning or by adding a second solution effective to remove the asphalt binder and/or the first solution.

The method may further feature e) cleaning or removing asphalt binder or petroleum-based coating from the solution of b). This may also be performed in an automated parts washer. The automated parts washer may be useful for washing with, and reclaiming the solvent.

The methods may be effective to remove 10%, 20%, 25%, 30%, 40%, or 50%, of the asphalt binder or petroleum-based coating from the surfaces of the coarse aggregate or fine aggregate asphalt components or minerals. The petroleum-based coating is in a solid state and solvent rinses provide a partial removal of the petroleum-based coating because the removal process is in a series of laminations. As each lamination is removed consecutively, the solvent removal of the petroleum-based coating approaches a complete removal of the petroleum-based coating from the petroleum-based material. This consecutive rinsing with solvent is costly and cost prohibitive. A single rinse can provide an effective removal of 10%, 20%, 25%, 30%, 40%, or 50% of the asphalt binder or petroleum-based coating from the surfaces of the coarse aggregate or fine aggregate asphalt components or minerals.

In a second aspect with respect to asphalt, the invention provides asphalt or an asphalt component to be reclaimed or recycled according to the methods described herein. The asphalt component may be one or more of a coarse aggregate, a fine aggregate, both including or comprising mineral aggregates, and an asphalt binder or petroleum-based coating. The asphalt binder or petroleum-based coating may be present in, for instance, conventional asphalt, roofing shingles, roofing paper, driveway patch mixes, crack sealers, etc. The reclaimed or recycled asphalt or asphalt components may have the physical properties in terms of size, shape, and profile for the aggregate or mineral portion as the original virgin asphalt or the asphalt binder or petroleum-based coating may feature binding properties equal to or better than the original virgin asphalt binder.

The coarse aggregate may include minerals or stones that have been reduced in size, and having particle sizes in the range from about ⅛ to 1 inch in diameter. The coarse aggregate may be substantially coated with asphalt binder or substantially coated with a suitable solution in which the asphalt binder is soluble. The coating may be substantially uniform or non-uniform, and the coating may be at a thickness of, for instance, about 1, 2, 3, 4, 5, 10, 25, 50, 100 or 200 μm or more.

The fine aggregate may include compositions of that has been reduced in size, stone dust, glass that has been reduced in size, sand or other small sized filler material having a diameter of about ¼, or ⅛ or ⅒ or ¹⁄₁₀₀ inch or less. The fine aggregate may be substantially coated with asphalt binder or substantially coated with a suitable solution in which the asphalt binder is soluble. The coating may be substantially uniform or non-uniform, and the coating may be at a thickness of, for instance, about 1, 2, 3, 4, 5, 10, 25, 50, 100 or 200 μm or more.

The asphalt binder may be a solid at room temperature. The asphalt binder may also be present as a liquid that is dissolved in a suitable solution in which the asphalt binder is soluble.

In a third aspect, the invention provides a reclaimed or recycled asphalt or asphalt component. The asphalt component may be one or more of a coarse aggregate, a fine aggregate and an asphalt binder. The asphalt binder may be present in, for instance, conventional asphalt, roofing shingles, roofing paper, driveway patch mixes, crack sealers, etc. The reclaimed or recycled asphalt or asphalt component may have the physical properties of virgin asphalt or may feature binding properties such as binding to an asphalt binder that is superior to the binding properties of virgin asphalt or virgin asphalt components.

The coarse aggregate may include minerals or stones that have been reduced in size, and having particle sizes in the range from about ⅛ to 1 inch in diameter. The coarse aggregate may be substantially coated with asphalt binder or substantially coated with a suitable solution in which the asphalt binder is soluble. The coating may be substantially uniform or non-uniform, and the coating may be at a thickness of, for instance, about 1, 2, 3, 4, 5, 10, 25, 50, 100 or 200 μm or more.

The fine aggregate may include compositions of stone dust that has been reduced in size, glass that has been reduced in size, sand or other small sized filler having a diameter of about ¼, or ⅛ or ⅒, or ¹⁄₁₀₀ inch or less. The fine aggregate may be substantially coated with asphalt binder or substantially coated with a suitable solution in which the asphalt binder is soluble. The coating may be substantially uniform or non-uniform, and the coating may be at a thickness of, for instance, about 1, 2, 3, 4, 5, 10, 25, 50, 100 or 200 μm or more.

The asphalt binder may be a solid at room temperature. The asphalt binder may be present as a liquid that is dissolved in a suitable solution in which the asphalt binder is soluble.

In a fourth aspect, the invention provides a two step integrated method to reclaim or recycle asphalt or asphalt components to produce reusable asphalt or asphalt components using two distinct solvents or solutions for dissolving asphalt binder or petroleum-based coatings featuring:
 (a) providing asphalt or asphalt components that have been reduced in size, and
 (b) adding the asphalt or asphalt components to a solution containing a solvent in which the asphalt binder is soluble.

The solution may be at approximately ambient temperature, for instance, 50-100° F., or 60-90° F., or 70-80° F. or so. The solvent may be, for instance, heptane, hexane, naphtha, kerosene, gasoline or a petroleum based solvent or any other suitable solvent in which the asphalt binder is soluble. The solution may be prepared as a bath in an appropriate container, such as a standard automated parts washer or equivalent equipment, to provide exposure to one or more solvents in which the asphalt binder is soluble. The asphalt binder is in a solid state, and the solvent may be provided in a liquid or gaseous state. As stated above, the materials as initially combined will reside in a first slurry mass, and include solid materials (aggregate coated with residual binder) and solvent/asphalt binder. The solid materials (aggregate coated with residual binder) may be separated via a screening operation while the solvent and asphalt binder can be further treated. The solvent and the asphalt binder or petroleum-based coatings in the final asphalt binder-solvent solution may then be further separated to form a reclaimed solvent mass and an asphalt binder mass.

The solvent may be effective to remove 10%, 20%, 25%, 30%, 40%, 50%, of the asphalt binder from the surfaces of the coarse aggregate or fine aggregate asphalt components.

The method may further feature crushing, grinding or breaking the asphalt to be reclaimed or recycled into chunks, millings or particulate prior to step a) above.

The method may further feature c) screening or separating coarse aggregate and fine aggregate asphalt components from the solution of step b).

The method may further feature step d) cleaning or removing asphalt binder and/or the solution from the coarse aggregate and fine aggregate asphalt components screened or separated in step c). The cleaning or removing asphalt binder and/or the solution from the coarse aggregate and fine aggregate asphalt components may be performed by centrifugal spinning or by adding a second solution effective to remove the asphalt binder and/or the first solution.

The method may further feature e) cleaning or removing asphalt binder from the solution of b). This may also be performed in a bath that may be an automated parts washer suitable for using solvents and for separating solvents and the asphalt binder.

The method may further feature f) adding the asphalt components obtained from c) or d) to a solution at a temperature higher than the melting temperature of the asphalt binder.

The solution may be at least 300° F., 325° F., 350° F. or 400° F. or so. The solution may be an oil or petroleum base solution or any other suitable solution in which the asphalt binder is soluble. In some instances, the solution may be virgin motor oil or recycled motor oil or used motor oil. This solution is referenced as an oil-based solution.

The solution may be effective to remove the 40%, 50%, 60%, 75%, 90% or more of the remaining asphalt binder or petroleum-based coatings from the surfaces of the coarse aggregate or fine aggregate asphalt components or mineral portion of petroleum-based materials.

The method may further feature g) screening or separating coarse aggregate and fine aggregate asphalt components from the solution of f).

The method may further feature h) cleaning or removing asphalt binder and/or the solution from the coarse aggregate and fine aggregate asphalt components screened or separated in step g). The cleaning or removing asphalt binder and/or the solution from the coarse aggregate and fine aggregate asphalt components may be performed by centrifugal spinning or by adding a second solvent effective to remove the asphalt binder and/or the first solution or oil-based solution coating on the minerals.

The method may further feature of step i) cleaning or removing asphalt binder from the solution of step f).

In one embodiment, the present invention embodies a hybrid crude oil and methods of making the same using one or several different petroleum-based waste stream products. The waste stream products may be man-made, natural, or the combination thereof. Man-made waste streams generally include roofing shingles and asphalt pavement or Hot Mix Asphalt Mix ("HMA"), while natural waste streams generally include tar sands, oil sands, and shale.

The hybrid crude oil is made from the petroleum-based coating of petroleum-containing materials being dissolved into a heated oil-based solution. The heated oil-based solution acts as the solvent for the petroleum-based coatings and creates a new mixture, referred to herein as hybrid crude oil. The heat or temperature needed for the oil-based solution is raised to, or above the melting or phase-change temperature of the petroleum-based coating, referred to herein as "elevated temperature." At or above this elevated temperature, the petroleum-based coatings phase-change from the solid state to the liquid state, and dissolve into the oil-based solution, creating the hybrid crude oil.

After the hybrid crude oil is created, it can be used, as would the initial oil-based solution, to successively remove more petroleum-based coatings from petroleum-containing materials until a desired concentration or mixture ratio of oil-based solution and petroleum-based coatings is achieved. At this stage, the hybrid crude oil is sent to a refinery for refining. The hybrid crude oil is created from a combined mixture of the oil-based solution and petroleum-based coatings on the petroleum-containing materials such as: roofing shingles, asphalt binder from asphalt pavement, sand tars, sand oils, and/or shale.

The petroleum-containing materials, such as roofing shingles, asphalt pavement, sand tars, sand oils, and/or shale, can be individually, in succession, or in combination as a mixture, be submerged into the oil-based solution, so as to cause their petroleum-based coatings to dissolve into the oil-based solution, as the oil-based solution absorbs a solute and creates the hybrid crude oil. Upon submerging the roofing shingles, asphalt pavement, sand tars, sand oils, or shale into the oil-based solution, an environmental seal is created by the oil-based solution because the oil-based solution is in a liquid state at both ambient and elevated temperature, and would fully saturate or enclose the petroleum-containing materials.

The liquid oil-based solution creates the environmental seal because it is a liquid. As the petroleum-containing material is submerged into the oil-based solution it settles towards the bottom because the petroleum-containing material is denser than the oil-based solution and can submerge on its own. It should be understood that mixing the oil-based solution can further aid in the submersion process of the petroleum-containing material into the oil-based solution. The environmental seal prevents the petroleum-based coatings from the roofing shingles, asphalt binder from the asphalt pavement, sand tars, sand oils, or shale, from burning, carburizing, or degrading, until the liquid oil-based solution is capable of providing the necessary thermal energy for achieving the melting or phase-change temperature of the petroleum-based coatings. At which time, the petroleum-based coatings safely phase-change into a liquid and dissolve into the oil-based solution, creating the desired hybrid crude oil.

The oil-based solution needs to be heated to the elevated temperature, i.e., above the melting or phase-change temperature needed for the submerged petroleum-based coating of the petroleum-containing material so that petroleum-based coating phase-changes from a solid state to a liquid state, so as to melt and dissolve into the oil-based solution. At ambient temperatures, submerging the petroleum containing materials into an oil-based solution will not melt or phase-change the petroleum-based coating and will not dissolve into the oil-based solution. It is therefore clear that, at ambient temperatures, the oil-based solution is not a solvent for the petroleum-based coatings on the petroleum-containing materials. When the heated oil-based solution is heated to, or above the elevated temperature of, for example, approximately 300-400° F., submerging the petroleum-containing materials into the heated oil-based solution will melt or phase-change the petroleum-based coating and will allow it to dissolve into the oil-based solution, creating the hybrid crude oil. The heated oil-based solution at, or above the elevated temperature becomes a solvent for the petroleum-based coatings on the petroleum-containing materials.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

Figure 1:
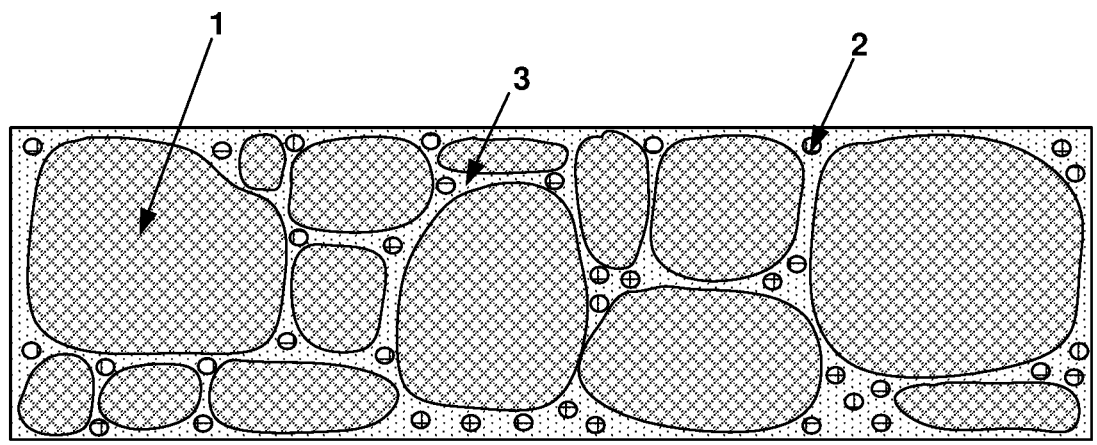
FIG. 1 illustrates a typical cross section of an asphalt mixture showing the coarse or mineral aggregate 1, fine aggregate 2 and asphalt binder 3.
Figure 2:
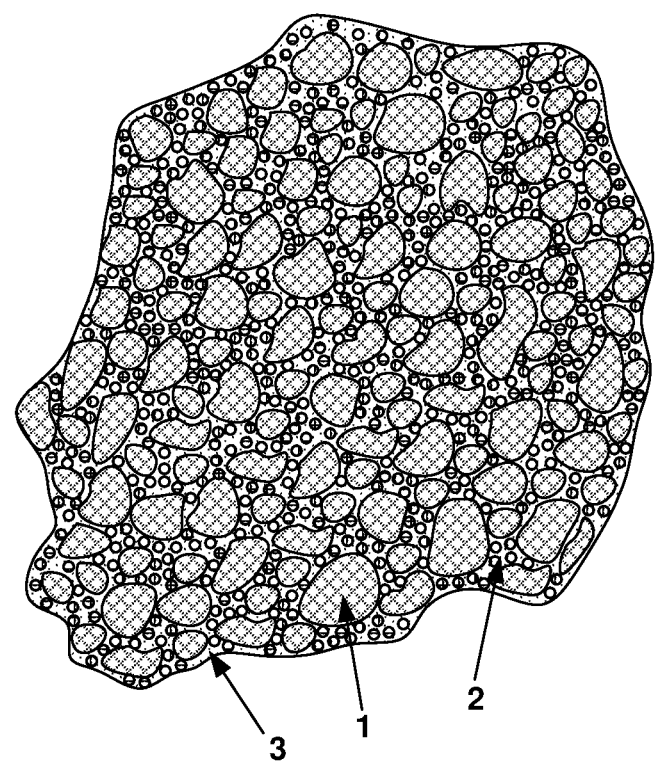
FIG. 2 illustrates a typical chunk of an asphalt mixture containing the coarse or mineral aggregate 1, fine aggregate 2 and asphalt binder 3.
Figure 3:
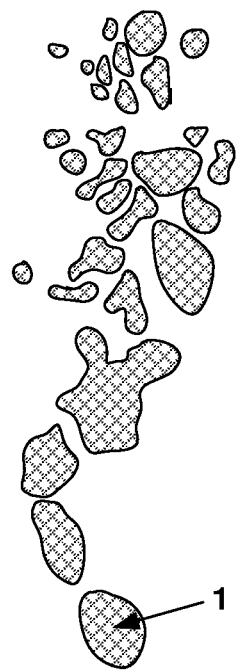
FIG. 3 illustrates the coarse or mineral aggregate 1 coated with solution.
Figure 4:
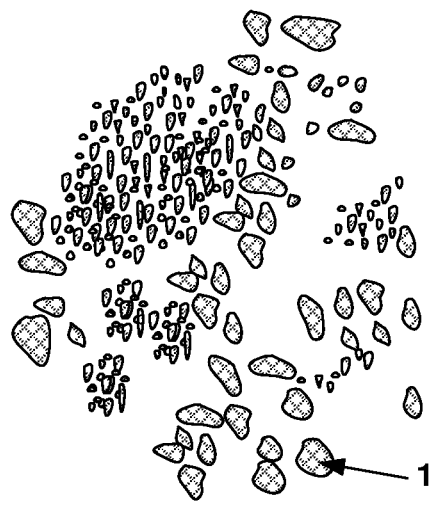
FIG. 4 illustrates the coarse or mineral aggregate 1 substantially free of any coating with asphalt binder.

It should be understood that the sizes of the chart and the different components in the figures might not be in exact proportion, and are shown for visual clarity and for the purpose of explanation.

DETAILED DESCRIPTION OF PREFERRED EMBODIMENTS

The Methods

The following definitions are presented for a better understanding of the terms used herein. Reasonable variations to the defined terms, derivations, and interpretations are foreseeable:

Crude oil is a natural product as provided by various reserves on earth. This natural product is processed or distilled into many other byproducts such as gasoline, kerosene, plastics, asphalt for roofing shingles, asphalt binder for asphalt pavement, and numerous other byproducts.

Petroleum-containing material or petroleum-based product is a natural or man-made product that has a petroleum-based coating. These petroleum-containing materials include, for example: roofing shingles, asphalt pavement or millings, roofing paper, asphalt, patch mix material, roofing tar, surface texture material, sand tars, oil sands, shale and other petroleum-containing materials.

Petroleum-based coating is a petroleum-based hydrocarbon, such as tar or bitumen, and is solid or near solid (collectively referred to herein as "solid") at around ambient or room temperature. Examples include the asphalt in roofing shingles, the asphalt binder in asphalt pavement or millings, the tar portion of tar sands, the oil portion of oil sands in solid or semi-solid states, and the solid petroleum portion of shale.

Asphalt binder is the "glue" that bonds the aggregate in asphalt pavement. It is a petroleum-based coating. It is designed to be solid or strong for load bearing characteristics.

Asphalt pavement is a macadam pavement that uses a bituminous binder or asphalt binder as the "glue" to bond aggregate or stones for use as a roadway or pavement.

Millings are asphalt pavements that have been recovered from a road surface or pavement and are broken or in a broken up form so as to be transported more easily.

Asphalt is the bituminous binder or "glue" for roofing shingles. It is similar to asphalt binder but its chemistry is designed so that it is malleable instead of being hard for load bearing as in the asphalt pavement.

Elevated temperature represents a temperature of the oil-based solution at or above the melting or phase-change temperature for a petroleum-based coating that causes the petroleum-based coating to liquify and dissolve into a liquid oil-based solution or a hybrid crude oil. For most petroleum-based coatings, the elevated temperature ranges between approximately 300° F. to approximately 400° F.

Waste stream product is a product that has no reuse or disposal solution after its useful life expires. At the end of the useful life of the waste stream product there is no industrial solution for the waste stream of the waste generated as in industries such as plastics, roofing, and asphalt pavement. As the product useful life expires there is a need to dispose of the old material and to replace it with virgin or new material. The continuous manufacture and usage of these products creates the waste stream. Natural products such as tar sands, oil sand, and shale are natural waste stream products. Nature converts animals and vegetation into a waste stream and creates the tar sands, oil sand, and shale over a long period of time.

Oil-based solution is the liquid (or petroleum-based liquid) that the petroleum-containing material is submerged into. At ambient temperatures, this liquid oil-based solution is inert to the petroleum-based coating of the petroleum-containing material. As the oil-based solution is heated at, or above the melting or phase-change temperatures ("elevated temperature") of the petroleum-based coatings, the oil-based solution acts as a solvent to the petroleum-based coatings and becomes able to dissolve the petroleum-based coatings into the oil-based solution. Within the process described, the oil-based solution after the initial (or first) dissolution of the petroleum-based coating from the petroleum-based material, creates a hybrid crude oil. This hybrid crude oil within the process described can be referenced as either a hybrid crude oil or as an oil-based solution, until such time as the extracted hybrid crude oil or oil-based solution from the described process has reached a desired concentration or mixture ratio of oil-based solution and petroleum-based coating is achieved. Once the desired concentration is reached and the oil-based solution is removed from the process described, the oil-based solution will be referred to as hybrid crude oil.

Hybrid crude oil is a term coined herein to represent a hybrid oil-based solution comprised of the oil-based solution and the dissolved petroleum-based coating therein. A related meaning of the term hybrid crude oil is, after the initial submersion of the petroleum-containing material into the oil-based solution and the petroleum-based coating has dissolved into the oil-based solution or hybrid crude oil, as additional petroleum-containing material is submerged into the oil-based solution and additional petroleum-based coating dissolve into the oil-based solution or hybrid crude oil it is still referred to as an oil-based solution until the oil-based solution achieves a desired percentage or concentration of petroleum-based coating dissolving into the oil-based solution. Upon achieving the desired concentration of petroleum-based coating dissolved into the oil-based solution, the entire solution is then referred to as hybrid crude oil.

Concentration is a measurement of the amount of solute present in a chemical solution, with respect to the amount of solvent. Reference is made to Helmenstine, Anne Marie, Ph.D. "Solute Definition and Examples in Chemistry." ThoughtCo, Feb. 11, 2020, thoughtco.com/definition-of-solute-and-examples-605922.

Solution is a homogeneous mixture of two or more substances. A solution may exist in any phase. A solution consists of a solute and a solvent. The solute is the substance that is dissolved in the solvent. The amount of solute that can be dissolved in solvent is called its solubility. For example, in a saline solution, salt is the solute dissolved in water as the solvent. Reference is made to Helmenstine, Anne Marie, Ph.D. "Solution Definition in Chemistry." ThoughtCo, Feb. 11, 2020, thoughtco.com/definition-of-solution-604650.

Solute is defined as the substance that is dissolved in a solution. For solutions of fluids, the solvent is present in greater amount than the solute. Concentration is a measurement of the amount of solute present in a chemical solution, with respect to the amount of solvent. Reference to Helmenstine, Anne Marie, Ph.D. "Solute Definition and Examples in Chemistry." ThoughtCo, Feb. 11, 2020, thoughtco.com/definition-of-solute-and-examples-605922.

Solvent is the component of a solution that is present in the greatest amount. It is the substance in which the solute is dissolved. Usually, a solvent is a liquid. However, it can be a gas, solid, or supercritical fluid. The amount of solvent required to dissolve a solute depends on temperature and the presence of other substances in a sample. The word "solvent" comes from the Latin solvo, which means to loosen or untie. Reference is made to Helmenstine, Anne Marie, Ph.D. "Solvent Definition in Chemistry." ThoughtCo, Feb. 11, 2020, thoughtco.com/definition-of-solvent-604651.

Approximately, about, significantly, and substantial are used herein to indicate that a stated number, amount, or value is an approximation, or is within a range of about plus or minus 5 to 10%.

Petroleum-based liquid is the oil-based solution. It can, for example, include: used, recycled or virgin motor oil and cutting fluids, solids at ambient temperatures, such as greases and waxes, and/or non-petroleum-based materials such as vegetable oils, vegetable fats, animal fats and similar compositions.

The following concepts should be emphasized for a better understanding of the present invention. The oil-based solution at ambient temperature is not a solvent. At ambient temperature, the oil-based solution does not act as a solvent for the asphalt binder or a petroleum-based coating on a petroleum-containing material. As an example, if road or asphalt pavement or millings were to be submerged and saturated with an oil-based solution, at ambient temperature, and then withdrawn from the oil-based solution, the result would be oil-coated road millings in which there was no solvent reaction between the oil-based solution and the petroleum-based coating or there was no petroleum-based coating removal. Thus, the oil-based solution does not act as a solvent for petroleum-based coatings at ambient temperatures.

However, according to the present invention, if road millings were to be submerged and saturated with an oil-based solution at a temperature at or higher than the melting or phase-change temperature (also referred to herein as "elevated temperature") of the asphalt binder (also referred to herein as "petroleum-based coating") within the road or pavement millings, then such process results in the following two events:

1. The initial event is that the bond of the petroleum-based coating, between the asphalt binder and the road or pavement milling aggregate would be completely removed (within a reasonably minimal and negligible margin of leftover) and dissolved into the oil-based solution, creating the hybrid crude oil. At elevated temperatures (at or above the melting or phase-change temperature of the asphalt binder or petroleum-based coating of the millings) the oil-based solution acts as a solvent for the asphalt binder of the road millings.
2. The second event is that the asphalt binder or petroleum-based coating (of the road millings) acts as a solute that dissolves into the heated oil-based solution (heated at or above the "elevated temperature") and the oil-based solution acts as the solvent. Once the asphalt binder or petroleum-based coating of the road or pavement millings dissolves into the oil-based solution, this new mixture is referred to as either an oil-based solution or hybrid crude oil. This solution (oil-based solution or hybrid crude oil) remains in a liquid state at elevated and ambient temperatures.

In a first aspect, the methods of the invention pertain to the retrieval and recovery of organic-based or organic-containing materials, including naturally occurring substances such as crude oil, and other petroleum-based or containing materials, natural gas, and the like, from environments where they are entrained within or otherwise admixed or complexed with other organic or inorganic materials, such as rock, sand, shale and the like. Included herein are sites where such petroleum products have previously been safely stored, and have breached their storage and have infiltrated surrounding soil and formed contaminated deposits or mixtures. In such instance, the methods comprise the following steps:

(a) retrieving a quantity of the petroleum-containing material;
(b) treating the petroleum-containing material with a solvent for the petroleum-based coating to separate from the petroleum-containing material;
(c) recovering the petroleum-containing material separated in step (b).

In a second aspect, the methods described pertain to the retrieval, recycling and recovery of manufactured materials or materials already in industrial use and for which reclamation and recycling are desired. This aspect is discussed in the following description with respect to the recycling of asphalt and asphalt components. It is to be understood however, that asphalt is exemplary of manufactured materials for which recycling and reclamation includes the separation of the organic (petroleum-based coating) component of the product from other inorganic/non-organic (aggregate or mineral) components which may themselves, merit retrieval and recovery. Accordingly, the following description should be considered as having broader applicability not limited to asphalt.

The methods described with respect to this second aspect are also useful for breaking down the asphalt mixture into its individual aggregate composition so that the asphalt binder is mechanically broken thereby exposing the aggregate surface area for a solvent cleaning procedure. In the industry, this may be equivalent to a mechanical "crushing" operation which breaks the asphalt binder supporting each aggregate particulate in the asphalt. Also, other commercial methods are available for such a "crushing" procedure including various agitation, compression, clamping, vibration and oscillation equipment.

The first solvent cleaning procedure may, for example be performed in an apparatus or by a system designed for the cleaning and separation of organic components from those that are inorganic or non-organic. A non-limiting exemplary such apparatus or system that replicates or performs the solvent cleaning procedure is a standard automated parts washer, such as those offered by PRI (Progressive Recovery, Inc., Dupo, IL). Such equipment or equivalent provides exposure to one or more solvents in which the asphalt binder is soluble. The asphalt binder is in a solid state, and the solvent is provided in a liquid or gaseous state. As the solvent disperses about the aggregate surface area, loose, broken edges and other forms of asphalt binder are dissolved into the solvent and a binder/solvent mixture is created. This solvent/binder mixture includes the asphalt binder that is small enough or loose enough to be carried into the binder/solution mixture.

The amount of asphalt binder or petroleum-based coating able to dissolve into the solvent is based upon the amount of rinses and how well the asphalt millings were reduced in size. The finer the breakdown the more broken asphalt binder surface area is exposed. In turn, the greater the amount of aggregate surface area exposed, the more the solvent is able to break down the aggregate asphalt binder coated surfaces and loose asphalt binder particulate.

The petroleum-based coating is in a solid state and solvent rinses provide a partial removal of the petroleum-based coating because the removal process is in a series of laminations. As each lamination is removed consecutively, the solvent removal of the petroleum-based coating approaches a complete removal of the petroleum-based coating from the petroleum-based material. This consecutive rinsing with solvent is costly and cost prohibitive. A single rinse can provide an effective removal of 10%, 20%, 25%, 30%, 40%, or 50% of the asphalt binder or petroleum-based coating from the surfaces of the coarse aggregate or fine aggregate asphalt components or minerals.

As stated above, the solvent may be provided in a bath or like treatment station, where the retrieved asphalt material or petroleum-based material may be immersed or otherwise exposed to the solvent cleaning step. Likewise, the treatment station may use an industrial automated parts washer. Such automated parts washers are designed for commodities other than asphalt aggregate such as, for instance, painted parts, degreasing parts, component surface preparations, etc. An automated parts washer may be retrofitted for solvent cleaning of the asphalt after the crushing procedure. In general, the "fluffier" the asphalt aggregate that has been reduced in size, the more surface area is exposed for the solvent to recover into the asphalt binder/solvent mixture.

In addition to the washing of the aggregate and creating the binder/solvent mixture, the treatment station recycles the solvent via standard or known condensation methods. The residual of the binder/solvent mixture, i.e., the asphalt binder, is recovered as a byproduct of the solvent washing procedure.

Thus, the methods described herein allow separating the asphalt binder from the binder/solvent mixture. This has not previously been performed and provides a novel separation method normally able to extract about 25-50% of the asphalt binder present on the surface of the "asphalt millings." The remainder of the asphalt binder remains as a coating or petroleum-based coating on the asphalt aggregate.

The solvent in the methods described herein is one that degrades or allows the asphalt binder to dissolve into the solvent to create the asphalt binder/solvent mixture. Suitable solvents include, for instance, heptane, hexane, naphtha, kerosene, gasoline and other petroleum based solvents. These are commercially available solvents, and based upon the solvent aggressiveness desired, the solvent can be suitably selected. Heptane is especially suitable as a solvent, and works particularly well in the present methods.

The Products Produced by the Methods

As the asphalt aggregate is treated by the solvent washing procedure, secondary screening operations may separate the aggregate into sized particulates. Each sized particulate may be remixed with a new asphalt mixture to provide improved asphalt mixture physical properties.

Binder Coated Coarse Aggregate. Large and medium sized aggregate with a significant asphalt binder coating or petroleum-based coating may be obtained. Each large and medium aggregate is coated with the residual asphalt binder that was not removed from the solvent cleaning operation performed in the automated parts washer. Thus, asphalt binder coated aggregate from the used asphalt millings are provided.

Binder Coated Fine Aggregate. These fine aggregate particulates are of special value in the asphalt industry. They may be used directly in other products such as crack fillers, asphalt repair mixtures, surface texture treatments, etc. These fine aggregates are the sand and stone dust of asphalt. They are the smaller particulate of the aggregate composition and are the most difficult to uniformly coat with asphalt binder or a petroleum-based coating. This product was not previously available as a stand-alone commodity. Thus, the methods described herein provide asphalt binder coated fine aggregate, a new commodity, useful in the asphalt, roofing, surface texture and other applications.

Binder/Solvent or Petroleum-Based Material Sludge from the automated parts washer. As the asphalt or petroleum-based material that has been reduced in size, is washed in the automated parts washer, the residual asphalt binder/solvent sludge or petroleum-based material/solvent sludge is further processed by the automated parts washer. This is a standard solvent washing process in which the solvent is evaporated from the binder/solvent sludge or petroleum-based material/solvent sludge, and the solvent is reclaimed via cooling coils and liquefied for reuse. The remaining binder/solvent mixture component is asphalt binder. The remainder of the petroleum-based material/solvent sludge is petroleum product. Thus, the methods described herein provide for recovering asphalt binder. This asphalt binder may have small traces of the solvent. Hence, the asphalt binder may be further processed to purify the asphalt binder into the desired asphalt binder grade or mixture.

Other Applications for the Methods Described Herein

The methods described herein may also be used for recycling roofing shingles or other products containing petroleum-based or containing compositions such as asphalt or asphalt binder. Used or discarded roofing shingles may be reduced in size to expose as much surface area of the roofing shingle asphalt binder. Then, as with the asphalt or HMA ("hot mix asphalt"), the solvent wash treatment station containing the solvent solution may be used to break down the asphalt binder and recover it. The remaining material may be sorted into aggregate and fiber glass debris for further reclamation or reuse.

Effects of the Methods Described Herein

The methods described herein enable the removal of all of the fine aggregate and a large portion of the residual asphalt binder from asphalt that has been reduced in size. Almost 50% of the worst processing features may be removed.

In a particular aspect, the methods described herein may be used as a first step in a two-step method. That is, the methods described herein may be a precursor to the methods described by Kotefski et al., U.S. Ser. No. 15/355,487, filed Nov. 18, 2016, commonly owned and co-pending herewith, the disclosure of which is incorporated herein in its entirety. Kotefski et al. teaches methods to reclaim or recycle asphalt or asphalt components to produce reusable asphalt or asphalt components by adding the asphalt or asphalt components to a solution at a temperature higher than the melting temperature of the asphalt binder. Using the methods described herein makes the combined process 10 to 20 times more effective in terms of energy usage, process footprint, equipment requirements, and overall need for oil and oil removal for reclamation.

Thereby the methods described herein reduce all of the fine aggregate processing needs and allow the second step of the reclaiming or recycling procedure, i.e., the boiling procedure using an oil-based solution, to only focus on the larger and medium aggregate with a residual petroleum-based coating. Thus, the amount of oil needed to process the large and medium aggregate is reduced by factors of 500% or more. The fine aggregates would fill the hot oil bath tanks or oil and would need fresh oil more often. Additionally, the fine aggregates are worth more as an asphalt coated product than an uncoated product.

By employing the methods described herein in a two-step process with those described in Kotefski et al., U.S. Ser. No. 15/355,487, filed Nov. 18, 2016, the total volume of oil required for the aggregate processing is reduced. Storage, transport and reprocessing at a refinery are eliminated for the fine aggregate components of the asphalt, and this provides a significant process improvement in terms of product cycle time, waste processing, waste control, energy usage and other benefits.

Two Step Integrated Methods for Reclaiming or Recycling Asphalt Using Two Distinct Solvents or Solutions Accordingly, and as just described above, the present methods described herein may be followed by a second procedure including further methods to retrieve, reclaim or recycle materials such as asphalt or asphalt components to produce reusable asphalt or asphalt components described herein including a) adding the asphalt or asphalt components obtained as described herein to a solution at a temperature higher than the melting temperature of the asphalt binder or petroleum-based coating. The solution may be at least 300° F., 325° F., 350° F. or 400° F. or so. The solution may be an oil or petroleum based solution or any other suitable solution in which the asphalt binder is soluble.

An oil-based solution acts as an environmental seal to the asphalt or asphalt components. As the asphalt is submerged in the oil-based solution, the asphalt binder is protected from degradation, burning and contamination. Current methods merely increase the asphalt temperature until the asphalt binder degrades because of the elevated temperature (and not by the dissolving into an oil based solution). This elevated temperature tends to burn the asphalt binder to a degree that it is unusable or it merely degrades it so that there is no possibility of the asphalt binder performing as would a virgin asphalt mixture.

As the millings or reclaimed asphalt is introduced or submerged into the heated oil-based solution, the asphalt binder phase changes from solid to liquid and quickly dilutes, mixes or integrates with the oil-based solution. Motor oil or an equivalent is especially suitable because the solution can be safely elevated to temperatures over 500° F. Motor oil also has a low volatility potential under elevated temperatures. Other potential oil-based solutions and/or mixtures thereof may also include; virgin, recycled or used motor oil, cutting fluids, greases, waxes, and many others oil based products. Each oil-based solution has a "flash point" or level of volatility and could ignite or explode. Other non-oil petroleum based solutions may also be suitable including, for instance, waxes, low temperature metals, etc.

As the asphalt binder is dissolved into the oil-based solution, the coarse and fine mineral aggregates are in a free state and are separated from the bond of the asphalt binder and the asphalt mixture. With a subsequent separation or screening procedures, the coarse and fine aggregates can be separated and used as raw material for new asphalt mixtures. The separation or screening procedures may be performed at an elevated temperature range because separating the asphalt binder from the aggregates is best and most easily accomplished in a liquid state. Thus, all residual asphalt binder and oil-based solution (compound solution) is able to drip off or can be spun off through a centrifugal spinning operation.

The second procedure or further methods to reclaim or recycle asphalt or asphalt components may also feature b) screening or separating coarse aggregate and fine aggregate asphalt components from the solution of a). The further methods may also feature c) cleaning or removing asphalt binder and/or the solution from the coarse aggregate and fine aggregate asphalt components screened or separated in step b). The cleaning or removing asphalt binder and/or the solution from the coarse aggregate and fine aggregate asphalt components may be performed by centrifugal spinning or by adding a second solution effective to remove the asphalt binder and/or the first solution.

The resultant separated asphalt composition is as follows:
(a) coarse aggregate coated with residual asphalt binder and oil based solution. This constitutes 75% of the asphalt mass and is a valuable commodity. Additionally, recycling this large percentage of the asphalt mixture provides environmental, energy, and equipment benefits.
(b) fine aggregate or sand/stone dust particulate coated with residual asphalt binder and oil based solution. Although this constitutes 10-20% of the total asphalt mixture, this recovered commodity has a higher value per pound than the coarse aggregate. Additionally, a pre-coated and screened fine aggregate has a further added value because it may be used in many other commodities.
(c) asphalt binder dissolved in the oil based solution. Although this solution is sludge, it has various polymer carbon chain molecules and would easily be recycled back into asphalt binder, mixes, roofing tar mixes, roofing shingle base materials, asphalt crack mixtures, driveway sealers, and the like. This solution of the oil-based solution and asphalt binder is referred to as a hybrid crude oil because it could be sent to a refinery for re-processing into virgin petroleum products.
(d) As it will be explained herein in more detail, this solution is referred as hybrid crude oil.

The coarse aggregate coated with residual asphalt binder and oil based solution (compound solution) may be cleaned. An added solvent cleaning operation can be applied to the coarse aggregate to remove the residual oil solution and asphalt binder. This coarse aggregate can then be reused in a virgin asphalt mixture and used to produce asphalt that is equivalent to or superior to a virgin asphalt mixture because the reclaimed coarse aggregate has a pre-coated film of asphalt binder mixture thereof and binds better than virgin coarse aggregate. The virgin coarse aggregate is pre-coated with asphalt binder, and is thus a novel asphalt mixture is made that is superior to current mixtures using virgin materials. The pre-coating of the aggregate allows the asphalt binders to develop stronger bonds than the uncoated aggregate.

The coarse aggregate coated with residual asphalt binder and oil based solution may be cleaned by merely spinning off excess residual asphalt binder and oil based solution (at an elevated or ambient temperature, because this solution remains in a liquid state at elevated and ambient temperatures). The spinning procedure removes the residual asphalt binder and oil-based solution material as well as provides a uniformly "oil-coated" coarse aggregate. In this case, this pre-coated coarse aggregate may prove to bond better to the asphalt binder because it is pre-coated but not dry (it would contain a small amount of the oil base solution. This simplified process may be slightly substandard to the solvent cleaning method but it would still be superior to the current method of using virgin coarse aggregates.

The fine aggregate or glass/sand/stone (that has been reduced in size) dust particulate coated with residual asphalt binder and oil based solution may also be cleaned by the coarse aggregate solvent and spinning methods described above for removing excess asphalt binder and residual oil-based solution. A solvent may be used to remove the oil based solution and asphalt binder residual material. In this case it is more important than the coarse aggregate because the size of the fine aggregate may be dust or sand sized, and the excess or residual coating may have a mass that is equivalent or equal to the desired recovered commodity, i.e., sand, dust, glass that has been reduced in size, or other fine aggregate composition. Additional size screening may be performed to further segregate the fine aggregate into desired sizes since certain sizes or consistencies may be more valuable than virgin fine aggregate. A further advantage and benefit of pre-coated fine aggregate may be realized because the fine aggregate provides the primary fill between the coarse aggregate. Their bond is important to the mechanical properties of the resulting asphalt. If the fine aggregate is pre-coated, then better grades of asphalt may be realized. The pre-coated fine aggregate is a by-product of the methods for reclaiming and recycling asphalt described herein.

The fine aggregate coated with residual asphalt binder and oil based solution may be cleaned by merely spinning, as with the coarse aggregate. This too creates a better asphalt mixture because the asphalt binder bond to the fine aggregate is better and more repeatable in terms of bond strength from batch to batch. By having pre-coated fine aggregate, sand and dust particulate, other asphalt related products may be improved as well. For example, asphalt repair mixtures, crack fillers, roofing shingle compositions and various asphalt related products could be impacted. Presently, no pre-coated fine aggregate, sand, dust or glass that has been reduced in size is available to the industry. The methods for reclaiming and recycling asphalt described herein may provide an improved material to these product lines.

The additional methods for reclaiming and recycling asphalt described herein may also feature d) cleaning or removing asphalt binder from the solution of step a). The asphalt binder dissolves in the oil based solution. The asphalt binder, normally a solid at room temperature, is now a liquid that is dissolved in the oil based solution. There are several options for using this mixture of asphalt binder and oil based solution. First, a screening process may be used to screen the heavy particulate from the oil based solution and reuse the oil based solution for further asphalt reclaiming and recycling. The sludge or residual asphalt binder may then be reclaimed and sent to a petroleum processing facility to break down the residual asphalt binder material and to separate and reconstitute the various petroleum products such as motor oils, asphalt binders, roofing tar and roofing shingle materials. The oil based solution may be screened and reused multiple times by separating the thicker asphalt binder from the oil based solution.

Benefits of the Asphalt Reclamation and Recycling Using the Two Step Integrated Methods The methods described herein recycle each asphalt component including the coarse aggregate, fine aggregate and asphalt binder. Coarse aggregate constitutes 70-80% of asphalt volume. In being able to recover this material, a cost and environmental savings is realized. Coarse aggregate is basically stone that has been reduced in size of varying sizes. Recovering the coarse aggregate from aged asphalt eliminates the need for new sources of coarse aggregate. The impact of this reclamation and recycling of coarse aggregate provides environmental and cost savings from (a) less need for or near elimination of need for new or virgin coarse aggregate supply, (b) less energy, man power, equipment and land costs required for obtaining the reclaimed versus virgin coarse aggregate, and (c); reduced need for federal, state and local regulation. Similarly, reclaiming or recycling fine aggregate would provide similar savings and improvements. Reclaiming or recycling the asphalt binder is the most challenging but in fact may prove to be the most needed.

The residual "sludge" produced by the methods for asphalt reclamation and recycling described herein is the asphalt binder in the oil based solution and is referred to herein as hybrid crude oil. It would likely need to be reclaimed at a petroleum reprocessing facility. On the other hand, oil supplies are dwindling and with potential oil shortages in the near future, the methods for asphalt reclamation and recycling also address potential oil shortages. In fact during recent oil shortages, the asphalt industry experienced potential shortages in asphalt binders (e.g. for roadways, parking facilities, roofing shingles, and tars). The methods for asphalt reclamation and recycling described herein are able to recycle current products and inventories back into a reusable form such that new sources of raw materials such as asphalt binders, asphalt repair mixtures, roofing shingle binders and roofing tars are recyclable to a large extent.

Further Description of the Asphalt Reclamation and Recycling Two Step Integrated Methods The methods for asphalt reclamation and recycling described herein provide a process that separates the main components of asphalt, i.e., coarse aggregate, fine aggregate and asphalt binder in such a way as to be fully recyclable to create an asphalt mixture that is equivalent or superior to virgin asphalt. Current asphalt recycling and reclamation efforts add aged or used asphalt (approx. 10-20%) to virgin asphalt. Such materials and mixtures are not comparable to virgin asphalt because in the asphalt blending, the aged asphalt retains some of its old asphalt binder and does not bond to the virgin asphalt binder in a homogeneous manner. Thus, asphalt product degradation occurs. This degraded form of asphalt may be adequate for driveways and parking lots, but for major uses such as roadways it may not meet performance requirements. Massive research and investigations have been made into this field, and no solutions have been provided previously.

The methods for asphalt reclamation and recycling described herein address this need and provide a way to meet the current best or virgin asphalt performance requirements by reclaiming or recycling aggregate from used asphalt. The methods for asphalt reclamation and recycling described herein are simple, grade the asphalt binder in such a way as not to leave asphalt binder on the coarse and fine aggregates that has crystallized, burned or added other impurities to the aggregates. Hence, the aggregates may be reused in another asphalt mixture. The methods for asphalt reclamation and recycling described herein simply dissolve the asphalt binder into an oil-based solution while basically cleaning the aggregate from the asphalt binder, thus creating a hybrid crude oil.

In terms of volume and weight, more than 90% of an asphalt composition is the coarse and fine aggregates. This makes methods for asphalt reclamation and recycling described herein extremely effective in recovering the basic raw materials needed for future asphalt production. The second procedure or further methods to reclaim or recycle asphalt or asphalt components described herein may be described by the following steps:

1. Provide any asphalt, or chunks, millings or particulate of asphalt. The existing asphalt may be reduced into suitable sized chunks or pieces.
2. Add the asphalt, or chunks, millings or particulate of asphalt to an oil-based solution at a melting temperature or phase change temperature of the asphalt binder (approximately 350-400° F.). The oil-based solution is preferably oil or petroleum based because the asphalt binder is oil based as well.
3. The oil based solution acts as an environmental seal such that the asphalt or chunks, millings or particulate of asphalt introduced or submerged into the solution does not "burn" but rather dissolves into the oil-based solution. A suitable solution may be, for instance, virgin, recycled or used motor oil.
4. As the asphalt, or chunks, millings or particulate of asphalt that has been reduced in size, are introduced into the oil-based solution, the asphalt binder phase changes from a solid to a liquid and quickly mixes or integrates with the oil based solution without damage (burning) to the asphalt binder.
5. As the binder is dissolved into the oil-based solution, the coarse and fine mineral aggregates are in a free state or separated from the previously bonded asphalt mixture. The minerals remain in their size, shape and profile as they were originally made into pavement asphalt or HMA ("hot mix asphalt").
6. Any suitable sequence of screening may be performed so that the coarse and fine aggregates can be separated. This separation may be performed at elevated or ambient temperatures since the asphalt binder in the oil-based solution is in a liquid state at elevated and ambient temperatures.
7. The resulting separated asphalt composition is as follows:
    a. coarse aggregate coated with a residual coating of asphalt binder and oil based solution mixture,
    b. fine aggregate or sand/dust particulate coated with a residual coating of asphalt binder and oil based solution mixture,
    c. asphalt binder dissolved in the oil based solution (hybrid crude oil).

Additional Applications.

The present invention extends to a method for separating and recovering respective components of soil, including minerals and "organic" materials, the latter including particular plant life, fermented vegetation, methane and other liquid and gaseous constituents, crude oil deposits, and the like. By way of background pertinent hereto, soils, and in particular those that can be characterized and described as "raw earth" contain and/or consist of a broad spectrum of materials of both organic and inorganic origin. It is likewise desirable to process such raw earth and to separate the noted components, either for collection and use of all such components for particular purposes, or to remove one or more of the components so as to effect the purification of a component for which isolation and recovery, accumulation and purification is desired.

A specific example of material that is desirably retrieved and separated from such a mixture, involves the recovery of petroleum and petroleum byproducts from contaminated soil, and more generally, the recovery of such petroleum and related products from virgin rock formations, such as shale deposits, as well as oil and tar-containing sands. In this embodiment of the method, the raw soil, rock or sand deposits would be subjected to a wash with a solvent such as heptane, after which the organics would be recovered in a solution with the solvent and could thereafter be separated from the solvent, and both the solvent and the solute would be individually recovered.

Correspondingly, the process involving the use of the solvent wash would permit the separation and recovery of the inorganic components of the soil/rock/sand deposits/sites which if desired, could then be further separated as to their constituents and either discarded or collected for specific end uses and applications.

In a further particular example, the method includes the excavation and treatment of sites where ground contamination has developed and is present, such as at the site of installation of oil storage tanks, where leakage of the tank or other contamination of the site has resulted over time. In such instance, the method would comprise the excavation and removal of the storage tank, the treatment of the adjacent ground from the site with a solvent wash, such as that of heptane, to dissolve and recover the organic contaminants, and the subsequent separation of the solvent and the organic contaminants and the purification and retrieval of each.

In a further embodiment of the invention and as set forth above, the present method can be used in the separation and recovery of crude oil from oil-containing underground deposits, such as oil-containing sands and shale oil deposits. Such deposits may be excavated and then treated in accordance with the method of the present invention to separate the petroleum from the mineral deposits in which it is entrained. Likewise, the mineral deposits may be cleansed and isolated for use in other industrial and corresponding applications.

In a still further embodiment of the invention, soil containing both minerals and material known as "organics" may be treated with the same method, to separate the respective components of such soils. Accordingly, the "organics" may be retrieved after the comminution of the soil material so that the organics may be separated and are recovered, for storage or usage in other areas. Likewise, the isolated and separated minerals may be freed from their intermixture and contamination with the other components of the soil sample and retrieved for corresponding usage for such minerals, such as with building construction, retrieval of elements for the formulation of ceramics and metals, and other applications where pure minerals are desired and used. In all such instances of the practice of the present method, the solvent or solvents that are used in the method may be individually separated, recovered and thereby reconstituted for reuse in the practice of the same method.

While certain of the preferred embodiments of the present invention have been described and specifically exemplified above, it is not intended that the invention be limited to such embodiments. Various modifications may be made thereto without departing from the scope and spirit of the present invention, as set forth in the following claims.

From the foregoing description, various modifications and changes in the compositions and methods of this invention will occur to those skilled in the art. All such modifications coming within the scope of the appended claims are intended to be included therein.

The present invention relates to a hybrid crude oil and methods of making the same using petroleum-containing materials or waste stream products. In this regard, the present invention is exemplified by waste streams of roofing shingles and asphalt pavements (or millings). These waste stream products contain petroleum-based coatings and use the methods described herein to fully (or substantially) dissolve the petroleum-based coatings into an oil-based solution. It should be understood that the method of making the hybrid crude oil according to the present invention is not limited to these exemplary waste stream products.

Figure 5:
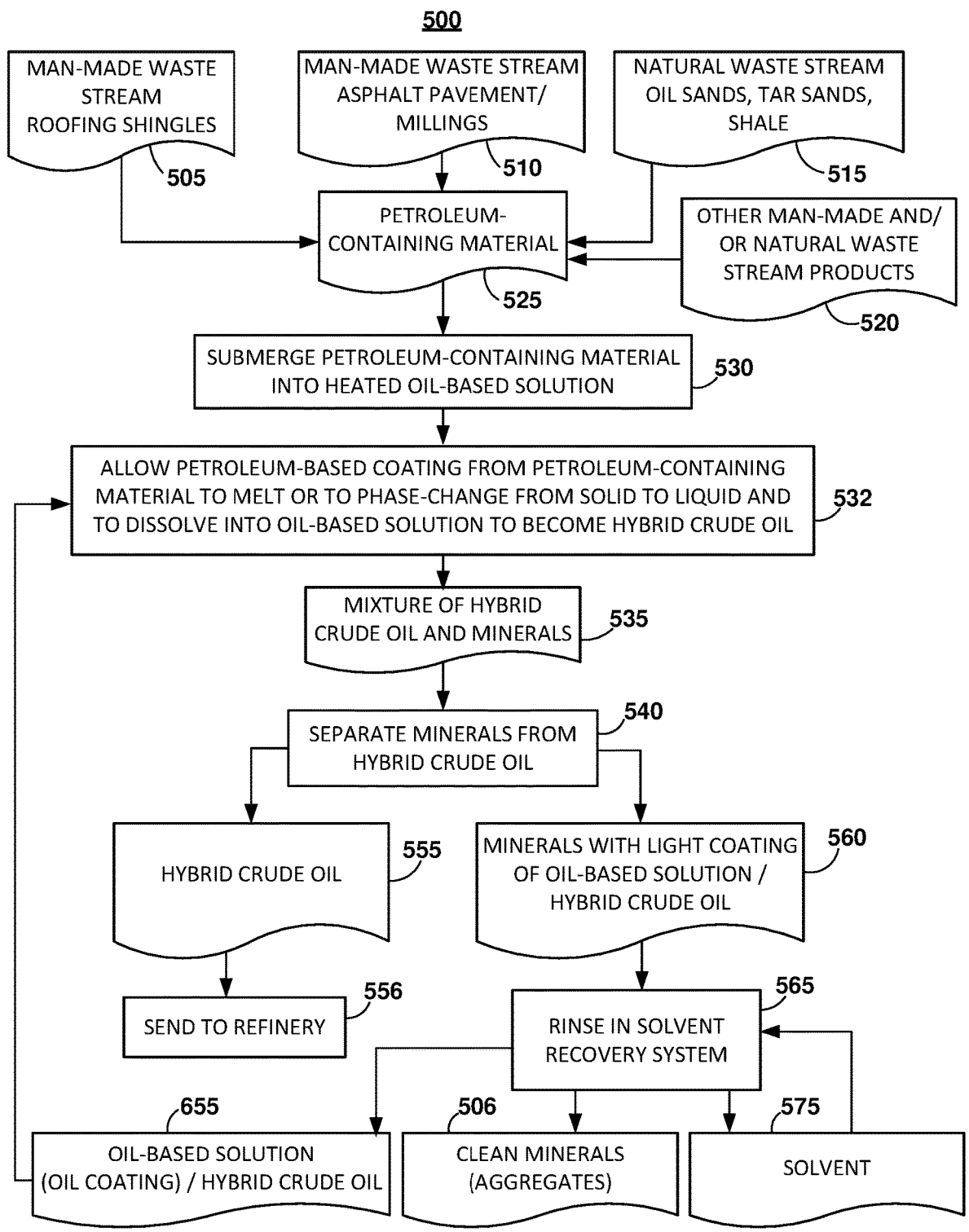
FIG. 5 is a flowchart illustrating a process of forming hybrid crude oil and extracting aggregates or minerals from one or more man-made or natural waste stream products, according to the present invention.
Figure 6:
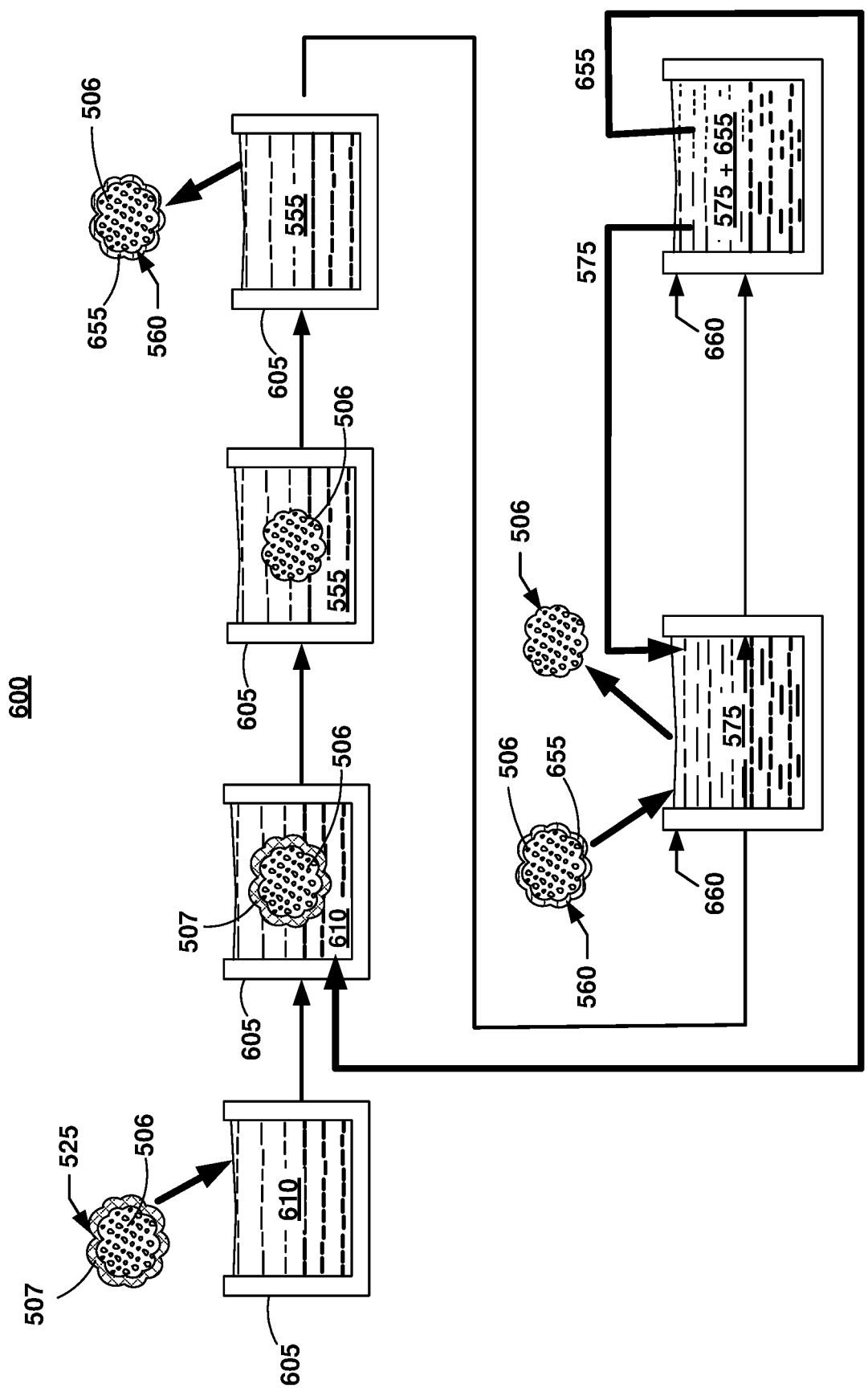
FIG. 6 is a high level illustration of a system for implementing the process of FIG. 5, according to the present invention.

Referring now to FIGS. 5 and 6, FIG. 5 illustrates a process 500 of forming hybrid crude oil 555 and extracting (or reclaiming) aggregates or minerals 506, 560 from one or more man-made and/or natural waste stream products 505, 510, 515, 520. FIG. 6 is a high level illustration of a system 600 for implementing the process 500 of FIG. 5.

FIG. 6 illustrates a container (basin or tank) 605 containing an oil-based solution 610 that was heated at or above the elevated temperature. As explained herein, the oil-based solution 610 is liquid, and may be comprised of virgin oil, recycled oil, used motor oil, and/or any suitable petroleum-based liquid that can be safely elevated to temperatures up to approximately 500° F. at atmospheric pressure.

In this exemplary, non-exclusive illustration, the waste stream products can be either man-made 505, 510, natural 515, or a combination thereof 520. For illustration purposes only and without any intent to limit the scope of the present invention, the first man-made waste stream product 505 may be comprised of roof shingles; the second man-made waste stream product 510 may be comprised of asphalt pavement/millings mixture; and the natural waste stream product 515 may be comprised of oil sands, tar sands, and/or shale.

As further in FIG. 5, at least some (or all) of the input waste stream products 505, 510, 515, 520 can be individually, sequentially, or as a selective combination, processed, and are collectively referred to as petroleum-containing material 525. As illustrated in FIG. 6, the petroleum-containing material 525 represents either one waste stream product or a selective combination thereof, and is shown herein, for illustration purpose only, as a solid material, such as a mineral (non-organic material or similar other material) 506 that is encapsulated (or coated) with a solid petroleum-based coating 507.

FIG. 6 illustrates a petroleum-containing material 525 as a mineral (aggregate or another non-organic material) with a petroleum-based coating that is representative of any one or more of the various illustrated waste stream products 505, 510, 515 or the combination thereof 520.

In general, the petroleum-based coating 507 is, and remains in solid state at ambient temperatures, while the oil-based solution 610 is, and remains in a liquid state at ambient and elevated temperatures. At ambient temperatures, the oil-based solution 610 would not dissolve the petroleum-based coating 507 from the petroleum containing material 525 because the petroleum-based coating 507 is a solid under ambient temperatures and it does not dissolve into the liquid oil-based solution 610. As explained herein, the removal and dissolving of the petroleum-based coating 507 from the petroleum-containing material 525 (which contains for example, roofing shingles, asphalt pavement or millings, roofing paper, asphalt, patch mix material, roofing tar, surface texture material, sand tars, oil sands, shale and other petroleum-containing materials) is based upon the heating of the oil-based solution 610 to an elevated temperature that equals or exceeds the melting or phase-change temperature of the petroleum-based coatings.

As an example, and as explained herein, the oil-based solution 610 may be heated to, and maintained at an exemplary elevated temperature of approximately 350° F. Other temperatures may alternatively be selected depending on the composition of the petroleum-containing material 525. For example, shale may need higher temperatures because the petroleum-based coating is more solid or crystallized than that of the asphalt binder in asphalt pavement.

The removal or dissolving of the petroleum-based coating 507 from the petroleum-containing material 525 (which may contain for example, roofing shingles, asphalt pavement or millings, tar sands, oil sands, shale, and other petroleum-containing materials) is based upon the heating of the oil-based solution 610 to the elevated temperature which equals or exceeds the melting or phase-change temperature of the petroleum-based coating 507. Each material is raised to a melting or phase-change temperature based upon the type of petroleum-based material being used.

To this end, and as illustrated at step 530 of FIG. 5, the petroleum-containing material 525 is submerged into the oil-based solution 610 that is heated and maintained at an elevated temperature for the petroleum-based coating 507 to phase change from solid state to liquid state. Until the temperature of the oil-based solution 610 is elevated up to, or exceeds the elevated temperature of the petroleum-based coating 507, the petroleum-based coating 507 remains in its solid form and the oil-based solution 610 does not act as a solvent to the petroleum-based coating 507. Once the oil-based solution 610 reaches or exceeds the elevated temperature of the petroleum-based coating 507, the oil-based solution 610 becomes (or converts to) a solvent for the petroleum-based coating 507, because it is able to provide the environmental seal and the needed temperature to cause the solid petroleum-based coating to phase-change into a liquid and to melt so as to be able to dissolve into the oil-based solution 610 before the petroleum-based coating 507 can burn, carburize, or degrade. Upon dissolving the petroleum-based coating 507 into the oil-based solution 610, the oil-based solution becomes a new solution of hybrid crude oil 555.

It should be clear that if the temperature of the oil-based solution 610 were not raised, simply adding or submerging the petroleum-based coating 507 from the petroleum-containing material 525 into the oil-based solution 610 at ambient temperature, the oil-based solution will not dissolve the petroleum-based coating 507 from the petroleum-containing material 525, over a reasonably and economically viable short period of time such as seconds and minutes and not days or years.

On the other hand, as the temperature of the oil-based solution 610 is raised to or above the elevated temperature needed to melt or phase-change the petroleum-based coating 507 from the petroleum-containing material 525, the oil-based solution 610 becomes a solvent for the petroleum-based coating 507. In other terms, the oil-based solution 610 is inert to the petroleum-based coating 507 at ambient temperatures but becomes or acts as a solvent to the petroleum-based coating 507 at temperatures at or above the melting or phase-change temperature or elevated temperature for the petroleum-based coating 507.

As a solvent, the heated oil-based solution 610 (at or above the elevated temperature) is a liquid that provides an environmental seal and the necessary thermal conductance needed to cause the petroleum-containing material 525 to phase-change and to melt the petroleum-based coating 507 from the petroleum-containing material 525 and to dissolve into the oil-based solution 610 (or after the initial dissolving into the crude oil 555). The environmental seal protects the petroleum-based coating 507 from degradation as the temperature of the petroleum-containing material 525 rises from the ambient temperature to the elevated temperature needed for the melting or phase change temperature of the petroleum-based coating 507. Having dissolved into the oil-based solution 610, the petroleum-based coating 507 becomes the solute of the solution or oil-based solution and would remain in a liquid state at both ambient or elevated temperatures, resulting in a mixture of hybrid crude oil 555 and minerals 506.

More specifically, and for illustration purpose only, upon submerging the petroleum-containing material 525, such as roofing shingles, asphalt pavement or millings, tar sands, oil sands, shale, or other petroleum containing material into the heated oil-based solution 610 at elevated temperatures, the heat energy of the oil-based solution 610, is transferred to the petroleum-containing material 525 as the petroleum-based coating 507 melts or phase-changes from solid to liquid. As the petroleum-based coating 507 melts and liquifies, it dissolves into the oil-based solution 610 which is a liquid at both ambient and elevated temperatures, resulting in the hybrid crude oil 555, which is a mixture of the oil-based solution 610 and the dissolved petroleum-based coating 507.

This new solution, i.e., the hybrid crude oil 555, can still be used as an oil-based solution 610 to keep absorbing more petroleum-based coatings 507 from the petroleum-containing material 525 as additional petroleum-containing material 525 is submerged into the oil-based solution 610. This new solution can still be referred to as oil-based solution 610 until it has achieved a desired percentage, concentration, or mixture ratio of initial oil-based solution 610 and petroleum-based coating 507 dissolved into it, whereupon it will be designated as hybrid crude oil. The desired range of the percentage, concentration, or mixture rate can vary from a single submersion of the petroleum-containing material 525 into the oil-based solution 610, to multiple submersions of additional petroleum-containing materials 525 into the oil-based solution 610.

Once the desired percentage of the initial oil-based solution 610 and petroleum-based coatings 507 that has dissolved into it has been achieved, this oil-based solution 610 will be referred to as hybrid crude oil 555. As illustrated at step 556 in FIG. 5, the hybrid crude oil 555 is then sent to a refinery for reclamation or recycling of new conventional petroleum products from the refinery.

Referring now to step 535 of FIG. 5, it illustrates the resulting effect of submerging the petroleum-containing material 525 into the heated oil-based solution 610, wherein the oil-based solution 610 has transformed into a hybrid crude oil 555. The container 605 of FIG. 6, contains a mixture of the hybrid crude oil 555 and the minerals 506. The minerals 506 have their petroleum-based coating 507 removed from them as it was dissolved into the heated (at or above the elevated temperature) oil-based solution 610. The minerals 506 retain their physical size, shape and profile less the petroleum-based coating 507 without damage or physical deformation.

At the next step 540 of the process 500 of FIG. 5, the minerals 506 are removed from container 605, separating them from the bulk of the hybrid crude oil 555. At this stage, the reclaimed minerals 506 are coated with a light coating 655 comprised essentially of hybrid crude oil 555 (or oil-based solution 610), and are referenced by the numeral 560 (FIGS. 5 and 6). The light coating 655 is and remains in a liquid state in both elevated and ambient temperatures.

At step 565 of process 500 (FIG. 5), the reclaimed coated minerals 560 are then introduced into a solvent recovery system 660 containing a solvent 575 to remove the light oil coating 655 off the mineral 560. The solvent recovery system 660 is able to separate the solvent 575, clean the minerals (aggregates, sand, etc.) 506, and separate the liquid oil coating 655 back into individual constituent components. The solvent recovery system 660 and the solvent 575 used herein may be any suitable system for the cleaning of the minerals 560 into clean minerals 506, and the recovery of the solvent 575 and the light oil coating 655, which system can be known or is available in the field.

The reclaimed cleaned minerals 506 may be placed back in circulation for reuse in the same or different industries as the original minerals. The separated solvent 575 may also be reused, for example, at step 565 as a solvent in the solvent recovery system 660. In addition, the separated and reclaimed liquid oil coating 655 may be mixed for example, with the oil-based solution 610 in which the petroleum-containing material 525 is submerged (step 532).

Having described the general operation (process 500) of the present system 600, the following description will provide specific illustrations of how man-made and natural waste stream products 505, 510, 515, 520 from the following exemplary sources, be implemented by the present process 500:
  A. Hybrid crude oil from a waste stream of roofing shingles.
  B. Hybrid crude oil from a waste stream of asphalt millings/millings.
  C. Hybrid crude oil from natural waste streams of sand tars, oil sands, and shale.
  D. Hybrid crude oil from other man-made and/or natural waste stream products.

A. Hybrid Crude Oil from a Waste Stream of Roofing Shingles

The hybrid crude oil 555 that is made by the process 500 of the present invention may result from several man-made sources, such as the waste stream of roofing shingles 505 and the waste stream of asphalt pavement/millings 510. Roofing shingles use asphalt as binder or glue for the mineral portion of the asphalt roofing shingles, while and the asphalt pavement is composed of an asphalt binder that acts as glue for the mineral or aggregate portion of the asphalt pavement.

The chemical compositions of the roofing asphalt and the pavement asphalt binder differ because the roofing shingles need to be pliable and are exposed to temperature extremes, while the pavement asphalt binder needs to be load bearing and is also exposed to temperature extremes. In both cases, the asphalt and asphalt binder are in a solid state which can be considered a semi-solid such as wax candles are in solid state which may be considered a semi-solid state (it can be soft or semi-solid) at ambient temperatures. Both the roofing shingle asphalt binder and the asphalt pavement asphalt binder are man-made in that they do not occur naturally but are created from the distillation of crude oil which is a natural product.

In this illustration, the mineral 506, forming the roofing shingles may include, for example, fiberglass, aggregates, and sands, and similar other materials.

The hybrid crude oil 555 is created by the mixture of oil-based solution 610 and the dissolution of the petroleum-based coating 507 from the roofing shingles. This newly formed solution, the hybrid crude oil 555, emulates crude oil because it contains carbon chain molecules that are not solely from the oil-based solution 610 or the roofing shingle asphalt. Rather, this solution or mixture (hybrid crude oil 555) may have differing specific compositions, depending on the input oil-based solution 610, the petroleum-based coating 507, and/or the asphalt from the roofing shingles.

B. Hybrid Crude Oil from a Waste Stream of Asphalt Pavement/Millings

The hybrid crude oil 555 may alternative be created by the mixture of oil-based solution 610 and the dissolution or dissolving of the petroleum-based coating 507 or asphalt binder from the asphalt pavement and/or millings. This newly formed solution, the hybrid crude oil 555, emulates crude oil because it contains carbon chain molecules that are not solely from the oil-based solution 610 or the asphalt binder of the asphalt pavement/millings. Rather, this solution or mixture (hybrid crude oil 555) may have differing specific compositions, depending on the input oil-based solution 610, the petroleum-based coating 507, and/or the asphalt from the asphalt binder from the asphalt pavement/millings.

C. Hybrid Crude Oil from Natural Waste Streams of Sand Tars, Oil Sands, and Shale Another form of natural waste streams (or waste stream products) 515 emanates from natural sources that include, for example and without limitation: sand tars, sand oils; and/or shale. Left in their natural state these natural sources are composed of minerals that are coated with petroleum-based coatings 507 and are effectively a natural form of contamination or a waste stream. These natural sources of petroleum-containing materials 515 (and/or 520) have a petroleum-based coating 507 that is generally similar to the petroleum-based coating 507 of the roofing shingles, asphalt pavement, or asphalt millings, except that the petroleum-based coating 507 of these natural sources are not man-made and are created by a natural waste stream.

Currently, this natural waste stream 515 is being harvested by the appropriate industries to directly extract the petroleum-based coating 507 from the natural minerals. However, the present invention discloses a process 500 for extracting the petroleum-based coating 507 by creating a new source of crude oil, termed hybrid crude oil 555 by dissolving the petroleum-based coating 507 away from the natural minerals 506 into an oil-based solution 610 and creating a hybrid crude oil 555. This hybrid crude oil 555 is extracted by removing the petroleum-based coating 507 from the mineral portion 506 of the natural waste stream of sand tars, sand oils, and/or shale, by melting or phase-changing the petroleum-based coating 507 so that it dissolves into the oil-based solution 610 as explained herein.

The petroleum-based coating 507 extracted from the sand tars, sand oils, and/or shale is different than the petroleum-based coating 507 extracted from the asphalt from roofing shingles or the asphalt binder from asphalt pavement or millings. The difference between the natural and man-made petroleum-based coatings is that the man-made petroleum-based coatings from roofing shingles and asphalt pavement or millings are homogeneous or similar carbon chain molecules and their mere extraction does not yield a crude oil but rather asphalt as in the roofing shingles or asphalt binder as in the asphalt pavement or millings.

The asphalt from roofing shingles and the asphalt binder from asphalt pavement contain a more homogeneous blend of carbon chain molecules which in general are the longest carbon chain molecules left in the refinery distillation process. By themselves, their mere extraction from the mineral portion of the petroleum-containing material 525, roofing shingles, or asphalt pavement does not make them a crude oil because of their homogeneous carbon chain of molecule composition. On the other hand, a natural crude oil has varied carbon-chained molecules, such that the refinery distillation can extract random carbon chained molecules from the lightest to the most dense.

The current industry process of extracting the petroleum-based coatings 507 to create crude oil from the natural waste stream of sand tars, sand oils, or shale, has proven to be an alternative or synthetic crude oil as termed by the trade. However, as stated earlier, unlike the man-made asphalt and asphalt binder, the natural petroleum-based coatings 507 that are extracted from sand tars, sand oils, or shale, contain varied carbon-chain molecules in size and composition such that they contain similar properties of natural crude oil.

In the extraction of the crude oils from sand tars, sand oils, or shale the industry uses processes that do not fully extract all of the petroleum-based coating 507 from the mineral portion 506 of the sand tars, sand oils, or shale. The reason for the partial extraction of the petroleum-based coating of petroleum-containing materials is that the industry uses water and steam as the basis for the extraction process. The present hybrid crude oil process 500 does not use water or steam but rather dissolves the petroleum-based coating 507 into an oil-based solution 610 to attain the hybrid crude oil 555 for a complete removal of the petroleum-based coating 507 from the minerals 525, 560. The current industry practice of partial extraction of crude oil (or the petroleum-based coating) from the sand tars, sand oils, or shale makes economic sense to the industry when petroleum prices are at certain price levels. The unextracted portion of the petroleum-based coating 507 remaining on the minerals 506 following the partial crude oil extraction creates serious man-made environmental or pollution issues.

The industry thrives to improve the extraction output of petroleum-based coating 507 and to minimize environmental or pollution hazards; however, prior to the advent of the present invention, there has been no practical and economical solution to remedy the current processing issue. The present invention describes a process for processing natural (and man-made) waste streams from sand tars, sand oils, or shale similarly to the process 500 described earlier for processing the man-made asphalt from the roofing shingles and the asphalt binder from the asphalt pavement or millings. In fact, the same process 500 can be used for a petroleum-containing material 525 that is composed of a mixture 520 of man-made and natural waste streams.

To improve environmental issues associated with the partially removed petroleum-based coatings from sand tars, sand oils, and shale, the process 500 of forming hybrid crude oil 555 of the present invention may be used directly onto the natural waste stream 515. In addition, the process 500 of forming hybrid crude oil 555 of the present invention may be used for the current industry output of partially removed petroleum-based coatings on sand tars, sand oils, and shale not only to recover the remaining petroleum-based coating but to also eliminate the pollution caused by the current method of creating partially coated sand tars, sand oils, and shale. As described herein, the present process 500 uses the oil-based solution 610 to remove the petroleum-based coatings 507 from the sand tars, sand oils, and shale in their entirety and to dissolve them into the oil-based solution 610 so as to create the hybrid crude oil 555. The hybrid crude oil 555 would be composed of the man-made oil-based solution 610 and the natural petroleum-based coatings 507 from the sand tars, sand oils, and shale whether they are in their natural state or in a partially petroleum-based coated state.

This new solution, i.e., the hybrid crude oil 555, is created by the ability of the oil-based solution 610 to dissolve the petroleum-based coating 507 from the oil tars, sand oils, or shale. The new hybrid crude oil 555 emulates crude oil because it contains the varied carbon-chain molecules of the natural petroleum-containing materials 515: oil tars, sand oils, or shale. The hybrid crude oil 555 is comprised of oil-based solution 610 and petroleum based coatings 507 and can still be used as an oil-based solution 610 to keep absorbing more petroleum-based coatings 507 from the petroleum-containing material 525 as the petroleum-containing material 525 is submerged into the oil-based solution 610.

The new hybrid crude oil 555 containing the petroleum-based coatings 507, may still be referred to as oil-based solution until it has achieved a desired percentage, concentration, or mixture ratio of the initial oil-based solution 610 and the petroleum-based coating 507 dissolved thereinto. This percentage, concentration, mixture ration can be from a single submersion of petroleum petroleum-containing material 525 into the oil-based solution 610 to multiple submersions of additional petroleum-containing material 525 into the oil-based solution 610. Once the desired percentage, concentration, or mixture ratio of the initial oil-based solution 610 and the dissolving petroleum-based coating 507 has been achieved, this oil-based solution 610 is referred to as a hybrid crude oil 555. The hybrid crude oil 555 may be sent to a refinery for reclamation or recycling of new or conventional petroleum product or byproduct.

The hybrid crude oils 555 from the various natural waste stream sources 515 of oil tars, sand oils, or shale, create unique hybrid crude oils based upon the natural composition of the site and the source specific oil tars, sand oils, or shale compositions of the petroleum-based coatings. Each oil tar, sand oil, or shale site will create its own hybrid crude oil 555 that has a varying composition of carbon-chain molecules.

D. Hybrid Crude Oil from Other Man-Made and/or Natural Waste Stream Products

Similarly to what has been described earlier, another source for the hybrid crude oil formed according to the present invention, can be from a mixture of man-made and/or natural waste stream products, i.e., 505, 510, 515, and may further include contaminated sites, such as, for example only, an oil spill site, a soil contamination site, and a hazardous waste.

As an exemplary embodiment of the present invention, the oil-based solution 610 may include any one or more of: virgin motor oil, recycled motor oil, used motor oil and/or any suitable petroleum-based liquid that can be safely elevated to temperatures of for instance, up to 500° F. at atmospheric pressure. Additionally, the liquid oil-based solution 610 can be from vegetable oils, waxes, greases, and/or other materials that can act as a solvent for petroleum-based coatings on petroleum containing materials 525.

The liquid oil-based solution 610 has a specific thermal conductivity or heat transfer rate of the heat energy from the oil-based solution 610 to the petroleum-based coating 507 in order to cause the latter to phase-change. In general, the faster the thermal conductivity can transfer the needed heat energy to melt or phase-change the petroleum-based coating 507 into a liquid, the sooner the dissolving process between the oil-based solution 610 and the petroleum-based coating 507 can occur. The melting or phase-change cycle time is important and a faster melting or phase-change cycle time reduces the likelihood of the petroleum-based coating being damaged by burning, carburizing, or other degradation.

In order to improve the thermal conductivity, if the liquid oil-based solution 610 were to contain metallic particulates within the liquid, the metallic particulates would serve as more effective conductors of thermal energy within the liquid and aid to improve the overall thermal conductivity properties of the liquid oil-based solution 610. Metals are better thermal conductors than liquids especially petroleum-based liquids and any metallic particulate within the oil-based solution would have a better thermal conductance than petroleum-based liquids without the metallic particulates.

In order to support this concept of a mixture of a liquid and solid metallic composition for the oil-based solution 610, metallic particulates can alternatively be added to the virgin motor oil, recycled motor oil, and/or petroleum-based liquids, so as to improve their thermal conductivity characteristics. Another petroleum-based liquid for use as the oil-based solution is from commercial waste streams of virgin motor oil, recycled motor oil, and petroleum-based liquids that already contain a metallic content. These commercial waste streams for the oil-based solutions include, for example:

a. Used motor oil. Used motor oil is not only a waste stream product from the combustion or other forms of engines, but it also has a metallic content from the engine component frictional forces.

b. Cutting tool fluids. As with the used motor oil, cutting tool fluids also have a metallic content from the cutting action of the tool.

c. Greases. Grease is a mixture of petroleum-based or oil-based composition, a thickener, and bismuth. Bismuth is the metal content. Greases are a semi-fluid or thick fluid that under elevated temperature becomes more fluid.

The use of these commercial waste stream products as the oil-based solution 610, not only improves the thermal conductivity of the oil-based solution 610 because of their metallic content, but it also provides a second life to a waste stream product such as the used motor oil, cutting tool fluids, and greases which would normally be recycled using refinery processes that are dedicated towards the specific waste stream product such as used motor oil, used cutting fluids, and used greases.

The oil-based solution 610 use of these commercial waste stream products could include non-petroleum-based materials, including used cooking oil, used vegetable oil, used bees wax, used vegetable fats, and used animal fats.

This recycling effort has inherent issues especially when this low value product is not properly disposed of. Current industrial recycling of used motor oil reclaims less than 60% of the used motor oil in this country. Reference is made to https://www.greenandgrowing.org/oil-recycling-101-oil-waste-facts/. The remaining 40% of the used motor oil is either burned as a fuel source or becomes an environmental pollutant. By adding a second life to the used motor oil as well as the used cutting fluids and used grease, an added economical value will be added to avoid these items becoming fuel sources or pollutants.

All publications, including but not limited to patents and patent applications, cited in this specification are herein incorporated by reference as if each individual publication were specifically and individually indicated to be incorporated by reference herein as though fully set forth.

What is claimed is:

1. A method of making a hybrid crude oil from a petroleum-containing material that includes a petroleum-based coating, the method comprising:
    forming a liquid solution comprised of:
        a liquid oil-based solution; and
        a liquified petroleum-based coating that dissolved in the oil-based solution;
    wherein the petroleum-containing material comprises at least one mineral that is coated with the petroleum-based coating;
    wherein the petroleum-based coating contains a variety of entrapped carbon chain molecules; and
    wherein the petroleum-based coating is liquified by submersion into the oil-based solution that is heated at approximately an elevated temperature of the petroleum-based coating so as to cause the petroleum-based coating to phase-change from a solid or semi-solid state to a liquid state and to dissolve in the heated oil-based solution, resulting in the release of the entrapped carbon chain molecules of the liquified petroleum-based coating into the heated oil-based solution, and the transformation of the oil-based solution into the hybrid crude oil.

2. The method of making the hybrid crude oil of claim 1, wherein the liquid oil-based solution does not act as a solvent for the petroleum-based coating at ambient temperatures.

3. The method of making the hybrid crude oil of claim 2, wherein the liquid oil-based solution acts as a solvent for the petroleum-based coating at a temperature at approximately the elevated temperature of the petroleum-based coating.

4. The method of making the hybrid crude oil of claim 1, wherein the petroleum-based coating within the petroleum-containing material originates from any one or more of man-made and natural waste streams.

5. The method of making the hybrid crude oil of claim 4, wherein the man-made waste streams with the petroleum-based coating include any one or more of: asphalt pavement or millings, asphalt roofing shingles, roofing paper, patch mix material, roofing tar, surface texture material.

6. The method of making the hybrid crude oil of claim 4, wherein the natural waste streams include any one or more of: tar sands, oil sands, shale, sludge, and contaminated soils.

7. The method of making the hybrid crude oil of claim 1, wherein the hybrid crude oil is a solution that is refinable using a petroleum refinery distillation process.

8. The method of making the hybrid crude oil of claim 1, wherein the liquid oil-based solution is selected from a petroleum-based liquid that can be elevated to a temperature of approximately 300° F. to 400° F. to provide an environmental seal to the entrapped carbon chain molecules of the liquified petroleum-based coating as the petroleum-based coating phase-changes to a liquid and dissolves into the oil-based solution to create the hybrid crude oil.

9. The method of making the hybrid crude oil of claim 8, wherein the petroleum-based liquid composition selection includes virgin, recycled, or used motor oil, greases, waxes, vegetable oils, vegetable fats, and animal fats.

10. The method of making the hybrid crude oil of claim 8, wherein the petroleum-based liquid includes any one or more of: used motor oil, used cutting fluid, used grease, used vegetable oil, used vegetable fats, and used animal fats.

11. The method of making the hybrid crude oil of claim 8, wherein the used waste stream materials of used motor oil, used cutting fluids, and used grease have a metallic content that aids in the thermal conductivity and heat transfer rate from the liquid oil-based solution to the petroleum-based coating during immersion, and reduces the potential of degradation of the petroleum-based coating as the petroleum-containing material is submerged into the liquid oil-based solution.

12. The method of making the hybrid crude oil of claim 11, wherein the metallic content is inherently contained within the used waste stream materials.

13. The method of making the hybrid crude oil of claim 1, further comprising metallic particulates that are added to the liquid oil-based solution to aid in the thermal conductivity and heat transfer rate of the liquid oil-based solution.

14. The method of making the hybrid crude oil of claim 1, wherein the liquid oil-based solution is selected from any one or more of: virgin, recycled, and used petroleum-based liquids.

15. The method of making the hybrid crude oil of claim 14, wherein the liquid oil-based solution includes any one or more of virgin, recycled, or used: motor oil, cutting fluid, cutting fluid, grease, and paraffin wax.

16. The method of making the hybrid crude oil of claim 14, wherein the liquid oil-based solution includes a non-petroleum-based liquid composed of virgin, recycled, and used: vegetable oil, cooking oil, vegetable fat, animal fat, and wax.

17. The method of making the hybrid crude oil of claim 4, wherein the hybrid crude oil creates a unique formulation based on the type of the petroleum-containing material being used.

18. The method of making the hybrid crude oil of claim 1, wherein upon dissolution of the petroleum-based coating into the liquid oil-based solution, the mixture of the liquid oil-based solution and petroleum-based coating remains in a liquid state at elevated or ambient temperatures.

19. A method of making a hybrid crude oil from a petroleum-containing material that includes a petroleum-based coating, the method comprising:
heating a liquid oil-based solution to a temperature of approximately an elevated temperature of the petroleum-based coating;
wherein the petroleum-based coating is solid or semi-solid at ambient temperature;
wherein the petroleum-containing material comprises a mineral that is coated with the petroleum-based coating;
wherein the petroleum-based coating contains a variety of entrapped carbon chain molecules; and
liquifying the petroleum-based coating by submerging the petroleum-containing material containing the solid or semi-solid petroleum-based coating into the heated the liquid oil-based solution so that the solid or semi-solid petroleum-based coating melts or phase-changes to a liquid at approximately the elevated temperature, so as to cause the liquified petroleum-based coating to dissolve into the heated liquid oil-based solution, resulting in the release of the entrapped carbon chain molecules of the liquified petroleum-based coating into the heated oil-based solution, and the transformation of the oil-based solution into the hybrid crude oil.

20. The method of making the hybrid crude oil of claim 19, wherein the liquification of the petroleum-based coating continues until a desired concentration of carbon chain molecules that are dissolved in the heated liquid oil-based solution is reached.

21. A method of making a hybrid crude oil from a petroleum-containing material that includes a petroleum-based coating, the method comprising:
heating a liquid oil-based solution to a temperature of approximately an elevated temperature of the petroleum-based coating;
wherein the petroleum-containing material comprises a mineral that is coated with the petroleum-based coating;
wherein the petroleum-based coating contains a variety of entrapped carbon chain molecules; and
causing at least some of the carbon chain molecules that are entrapped in the petroleum-based coating to be released into a heated oil-based solution that contains dissolved of carbon chain molecules, in order to enrich or replenish the oil-based solution to a pre-determined concentration level as to convert the oil-based solution into the hybrid crude oil.

22. The method of claim 21, wherein causing at least some of the carbon chain molecules that are entrapped in the petroleum-based coating to be released into a heated oil-based solution includes liquifying the petroleum-based coating by submerging the petroleum-containing material containing the petroleum-based coating into the heated the liquid oil-based solution so that the petroleum-based coating melts or phase-changes to a liquid at approximately the elevated temperature, so as to cause the liquified petroleum-based coating to dissolve into the heated liquid oil-based solution, resulting in the release of the entrapped carbon chain molecules of the liquified petroleum-based coating into the heated oil-based solution, and the transformation of the oil-based solution into the hybrid crude oil.

23. The method of claim 21, wherein the concentration of carbon chain molecules that are dissolved in the oil-based solution is a diminished concentration that is lower than the pre-determined concentration level of the hybrid crude oil.

* * * * *